(12) United States Patent
Arai

(10) Patent No.: US 8,497,998 B2
(45) Date of Patent: Jul. 30, 2013

(54) PRINTING SYSTEM USING MEDIA INTEGRATED INFORMATION, AN INFORMATION UPDATE METHOD THEREOF, AND A STORAGE MEDIUM STORING A PROGRAM THEREFOR

(75) Inventor: Katsutoshi Arai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 902 days.

(21) Appl. No.: 12/633,117

(22) Filed: Dec. 8, 2009

(65) Prior Publication Data

US 2010/0085591 A1 Apr. 8, 2010

Related U.S. Application Data

(63) Continuation of application No. PCT/JP2009/002729, filed on Jun. 16, 2009.

(30) Foreign Application Priority Data

Jun. 17, 2008 (JP) ................... 2008-158552

(51) Int. Cl.
*G06F 15/00* (2006.01)
*G06F 3/12* (2006.01)
*G06K 1/00* (2006.01)

(52) U.S. Cl.
USPC ........................ 358/1.13; 358/1.15

(58) Field of Classification Search
None
See application file for complete search history.

(56) References Cited

U.S. PATENT DOCUMENTS

| 8,249,801 B2* | 8/2012 | Sakai et al. .................. 701/408 |
| 2004/0012804 A1 | 1/2004 | Kasuga ........................ 358/1.13 |

FOREIGN PATENT DOCUMENTS

| JP | 2002-297343 | 10/2002 |
| JP | 2004-054417 | 2/2004 |
| JP | 2005-141587 | 6/2005 |
| JP | 2005-173983 | 6/2005 |

* cited by examiner

*Primary Examiner* — Douglas Tran
(74) *Attorney, Agent, or Firm* — Fitzpatrick Cella Harper & Scinto

(57) ABSTRACT

The size of a medium update program for adding a medium to a printer driver and printer is becoming larger due to an increasing number of available media, a larger-size profile used for image processing, and a variety of media lineups. A medium update program according to this invention searches for necessary medium integrated information based on an area and lineup information selected by a user. Then, the medium update program selects and inputs necessary medium integrated information, and shares information common to media, thereby creating all-media integrated information.

6 Claims, 18 Drawing Sheets

FIG. 1
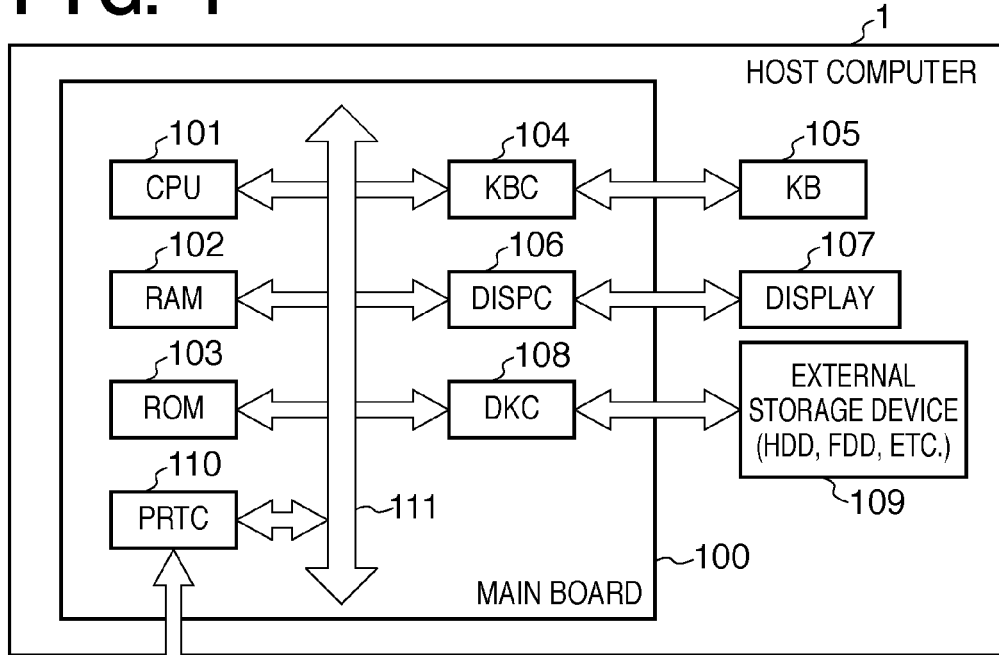
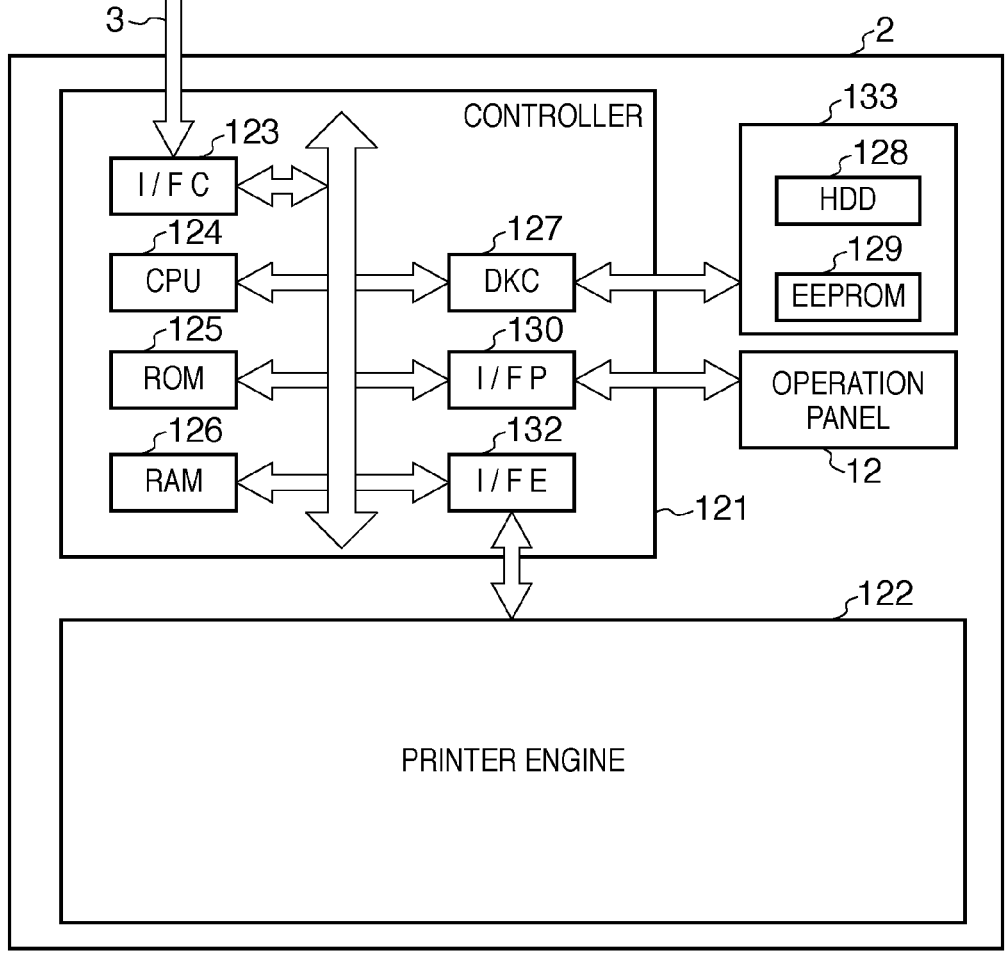

F I G. 10
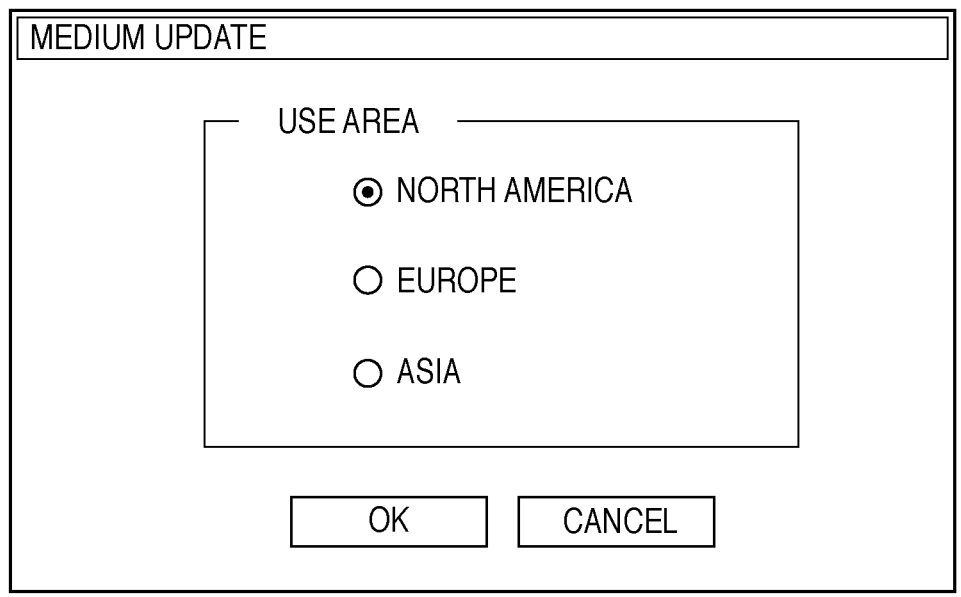

PRINTING SYSTEM USING MEDIA INTEGRATED INFORMATION, AN INFORMATION UPDATE METHOD THEREOF, AND A STORAGE MEDIUM STORING A PROGRAM THEREFOR

TECHNICAL FIELD

The present invention relates to a printing system, information update method, and program and, more particularly, to a printing system, information update method, and program applicable to various kinds of media.

BACKGROUND ART

In printing apparatuses (e.g., an inkjet printing apparatus, electrophotographic printing apparatus, and offset printing apparatus) which support many kinds of media (print media), a profile used for image processing and hardware control information change depending on the medium. Thus, the firmware and printer driver of such a printing apparatus internally hold various kinds of control information of each medium.

Some media come on the market after a user bought a printing apparatus, and some media are sold in a limited sales area. In such a case, the printing apparatus and printer driver have to support a new medium after the release of the printing apparatus.

For this reason, the firmware and printer driver of the printing apparatus hold various kinds of control information of each medium in a form separated from software. A medium update program updates these kinds of control information of each medium in the firmware and printer driver.

By employing this configuration, a manufacturer can cope with media newly supported after the release of a printing apparatus without upgrading the firmware and printer driver with much effort (see patent publications 1 and 2).
Prior Art References
Patent Publications
Patent Publication 1: Japanese Patent Laid-Open No. 2002-297343
Patent Publication 2: Japanese Patent Laid-Open No. 2004-54417

DISCLOSURE OF INVENTION

Problems that the Invention is to Solve

Due to advanced paper feed performance, the number of media supportable by printing apparatuses tends to increase. Various kinds of control information of each medium require a large amount of information due to a profile used for image processing and the like. Further, a lineup of media available in a printing apparatus changes depending on the area, application purpose, sales period, software version, and the like. It is very cumbersome to determine media for use in each printing apparatus in consideration of these different conditions for each printing apparatus and add various kinds of control information of each medium to the printer driver and printing apparatus main body.

For this reason, the medium update program internally holds various kinds of control information of each medium for each lineup, resulting in a large program size. A program developer needs to create various kinds of control information of each medium for each lineup. This makes the development work very heavy.

To prevent this, it has become popular to use a medium update program. This program creates a media lineup (to be referred to as all-media integrated information) by connecting various kinds of control information of a plurality of media for use in a printing apparatus in a predetermined order. Various kinds of control information can therefore be applied to the printing apparatus at once. However, a media lineup is created for each sales area, application purpose, sales period, and software version of the printing apparatus. The medium update program internally holds various kinds of control information of each media lineup. As a result, the program size (data amount) increases year after year. A program developer needs to create each media lineup by connecting various kinds of control information of media belonging to a media lineup in a predetermined order so as to generate data which can be handled at once. If the number of media lineups increases, the labor of work by the developer becomes very heavy.

The present invention has been made to overcome the conventional drawbacks, and has as its object to provide a printing system, information update method, and program capable of flexibly coping with even a change of available media by updating a minimum amount of information.

Means of Solving the Problems

To achieve the above-described object, a printing system according to the present invention comprises the following arrangement.

More specifically, there is provided a printing system comprising a printing apparatus capable of printing on a plurality of types of media, and a host which supplies information necessary for printing to the printing apparatus, wherein the printing apparatus comprises: firmware which controls a print operation; a nonvolatile memory which stores medium control information separated from the firmware and referred to when the firmware controls the print operation; and a printer engine which prints on the medium by executing the firmware, and the host comprises: a printer driver which generates image data and a control command to be supplied to the printing apparatus; storage means for storing medium characteristic information separated from the printer driver and referred to when the printer driver generates the image data and the control command; holding means for holding medium integrated information containing medium characteristic information and medium control information on one medium; display means for displaying, based on lineup information for creating all-media integrated information from pieces of medium integrated information of a plurality of media, a menu window to prompt a user to select the lineup information; and update means for creating the all-media integrated information from medium integrated information described in lineup information selected by the user from the menu displayed on the display means, and updating the medium control information stored in the nonvolatile memory of the printing apparatus and the medium characteristic information stored in the storage means by using the created all-media integrated information.

According to another aspect of the invention, there is provided an information update method in a printing system including a printing apparatus capable of printing on a plurality of types of media, and a host which supplies information necessary for printing to the printing apparatus comprising: a print control step of causing the host to control the printing apparatus to print by using medium control information which is separated from firmware for controlling a print operation of the printing apparatus, stored in a nonvolatile memory of the printing apparatus, and referred to when the firmware controls the print operation, and medium characteristic information which is separated from a printer driver that generates image data and a control command to be supplied to the printing apparatus, runs in the host, and is stored in a memory of the host, and referred to when the printer driver generates the image data and the control command; a display step of causing the host to display, based on lineup information for creating all-media integrated information comprised from pieces of medium integrated information of a plurality of media by using medium integrated information which is held in the host and contains medium characteristic information and medium control information on one medium, a menu window on a display of the host to prompt a user to select the lineup information; and an update step of creating the all-media integrated information from medium integrated information described in lineup information selected by the user from the menu, and updating the medium characteristic information stored in the memory of the host and the medium control information stored in the nonvolatile memory of the printing apparatus by using the created all-media integrated information.

According to still another aspect of the invention, there is provided a program executed in a host computer which is connected to a printing apparatus capable of printing on a plurality of types of media and including storage means for storing medium control information to be referred to when controlling a print operation and which operates a printer driver for generating image data and a control command to be supplied to the printing apparatus by referring to medium characteristic information stored in a memory of the host computer separately from the printer driver, causing the host computer to execute a procedure of displaying, based on lineup information for creating all-media integrated information comprised from pieces of medium integrated information of a plurality of media by using medium integrated information which is held in the host computer and contains medium characteristic information and medium control information on one medium, a menu window on a display of the host computer to prompt a user to select the lineup information, and a procedure of creating the all-media integrated information from medium integrated information described in lineup information selected by the user from the menu, and using the created all-media integrated information to control updating the medium characteristic information stored in the memory of the host computer as well as control the printing apparatus to update the medium control information stored in the storage means of the printing apparatus.

Effects of the Invention

The present invention can reduce the amount of information necessary for update processing by selectively inputting medium characteristic information and medium control information concerning a new medium which becomes newly available, and sharing information common to a plurality of media in update. For example, in a case where such update is processed by a program, the update program can be downsized.

The update suffices to be performed every time a new medium becomes available. No media lineup need be created in advance, and the cost of creating a media lineup can be reduced.

Further features of the present invention will become apparent from the following description of exemplary embodiments with reference to the attached drawings. Note that the same reference numerals denote the same or similar parts throughout the accompanying drawings.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 1 is a block diagram showing the configuration of a printing system as a typical embodiment of the present invention;

FIG. 10 is a view showing a menu window displayed on a display 107 of a host 1;

MODE FOR CARRYING OUT THE INVENTION

Figure 2:
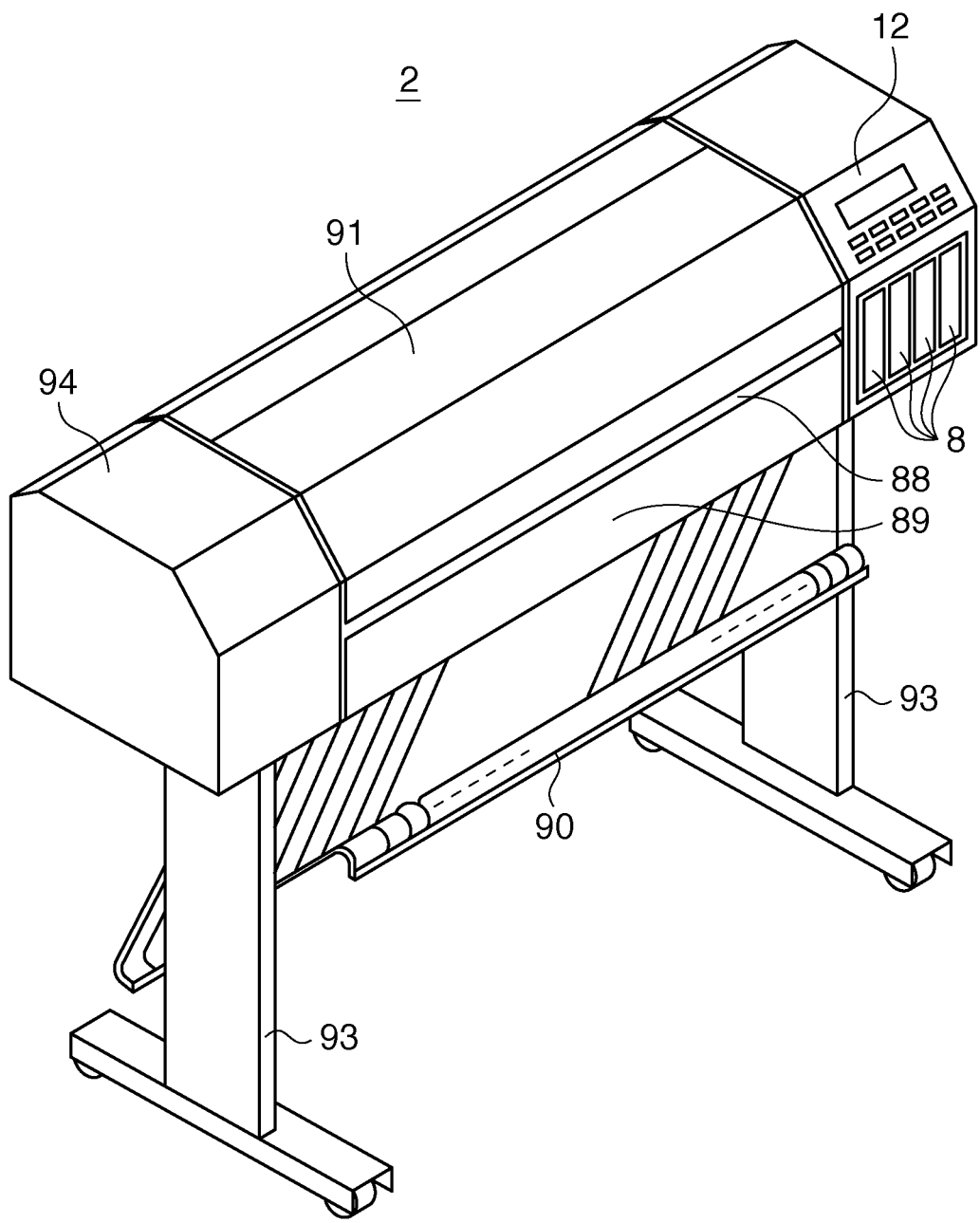
FIG. 2 is a perspective view of the outer appearance of an inkjet printer which builds the printing system shown in FIG. 1.

Typical embodiments of the present invention will now be described in detail with reference to the accompanying drawings. Note that the same reference numerals as those described above denote the same parts, and a repetitive description thereof will be omitted.

In this specification, the "printing" (to be also referred to as "print") not only includes the formation of significant information such as characters and graphics, but also broadly includes the formation of images, figures, patterns, and the like on a print medium, or the processing of the medium, regardless of whether they are significant or insignificant and whether they are visualized so as to be visually perceptible by humans.

Also, a "print medium" not only includes paper used in common printing apparatuses, but also broadly includes materials capable of accepting ink, such as cloth, a plastic film, a metal plate, glass, ceramics, wood, and leather.

Furthermore, "ink" (to be also referred to as a "liquid") should be extensively interpreted similar to the definition of "printing (print)". That is, "ink" means a liquid which, when applied onto a print medium, can form images, figures, patterns, and the like, can process the print medium, or can process ink (e.g., solidify or insolubilize a color material in ink applied to the print medium).

<Configuration of Printing System (FIG. 1)>

FIG. 1 is a block diagram showing the schematic configuration of a printing system including a host computer (to be referred to as a host) 1 and an inkjet printer (to be referred to as a printing apparatus) 2 as a typical embodiment of the present invention. The present invention will exemplify an inkjet printer as the printing apparatus, but is not limited to this. The present invention is applicable to, for example, either an electrophotographic printer or offset printing press as long as the printer has, for each medium, at least either driver medium characteristic information used by a driver in the host or medium control information used by the printer.

As shown in FIG. 1, the host 1 and printing apparatus 2 are connected to each other via a predetermined bidirectional interface 3 (e.g., a USB, IEEE1394, or TCP/IP interface). A typical example of the host 1 is a personal computer (PC).

The host 1 includes a main board 100 including a CPU 101 and the like, a keyboard (KB) 105, a display (DISPLAY) 107 such as an LCD, and an external storage device 109 such as a hard disk (HDD) or flexible disk (FDD).

The main board 100 further includes a RAM 102, ROM 103, keyboard controller (KBC) 104, display controller (DISPC) 106, disk controller (DKC) 108, and printer controller (PRTC) 110.

The CPU 101 comprehensively controls the building components connected to a system bus 111 and executes a variety of programs. The keyboard controller (KBC) 104 controls input from the keyboard 105 and a pointing device (not shown). The keyboard controller 104 is also called an operation unit or input unit. The display controller (DISPC) 106 controls display on the display 107. The RAM 102 functions as a main memory or work area for the CPU 101. The ROM 103 stores an operating system, programs for executing functions according to the embodiment, a boot program, various applications, user files, a printer control command generation program (to be referred to as a printer driver), and the like.

The disk controller (DKC) 108 controls access to the external storage device 109 such as a hard disk or Flexible Disk®. The printer controller (PRTC) 110 is connected to the printing apparatus 2 via the bidirectional interface 3, and controls communication processing of data and commands with the printing apparatus 2.

The printer 2 includes a controller 121, printer engine 122, operation panel 12, and nonvolatile storage device 133. The printer 2 is connected to the host 1 via the bidirectional interface 3. The nonvolatile storage device 133 includes a hard disk (HDD) 128 or EEPROM 129. The nonvolatile storage device is sometimes called a nonvolatile memory.

The controller 121 includes a CPU 124, ROM 125, RAM 126, interface controller (I/F C) 123, disk controller (DKC) 127, panel interface (I/F P) 130, and engine interface (I/F E) 132.

The CPU 124 executes a variety of programs. The ROM 125 receives data and commands from the host 1, and controls the printer engine 122 to store programs and various data for implementing optimal printing. The RAM 126 is used as a work area for temporarily storing various data and various programs. In this case, the data mean print image data, and the commands mean a print command, a command to inquire an apparatus status such as the remaining amount of roll print paper, and a command to change printer settings.

The interface controller (I/F C) 123 is connected to the host 1 via the bidirectional interface 3, and controls communication processing of data and commands with the host 1. The hard disk (HDD) 128 stores a large amount of data such as data from the host 1 and information associated with the data. The EEPROM 129 stores printing apparatus-specific information and the like used in a print operation. The disk controller (DKC) 127 controls access to the nonvolatile storage device 133. The panel interface (I/F P) 130 controls display on the operation panel 12 and input from the operation panel 12. The engine interface (I/F E) 132 directly controls the hardware and controls the printer engine 122 to implement optimal printing.

In the embodiment, the printer engine 122 is a printer engine using an inkjet printing method. However, an electrophotographic printer engine or offset printing press is also usable.

<General Description of Inkjet Printer Main Body (FIGS. 2 and 3)>

Figure 3:
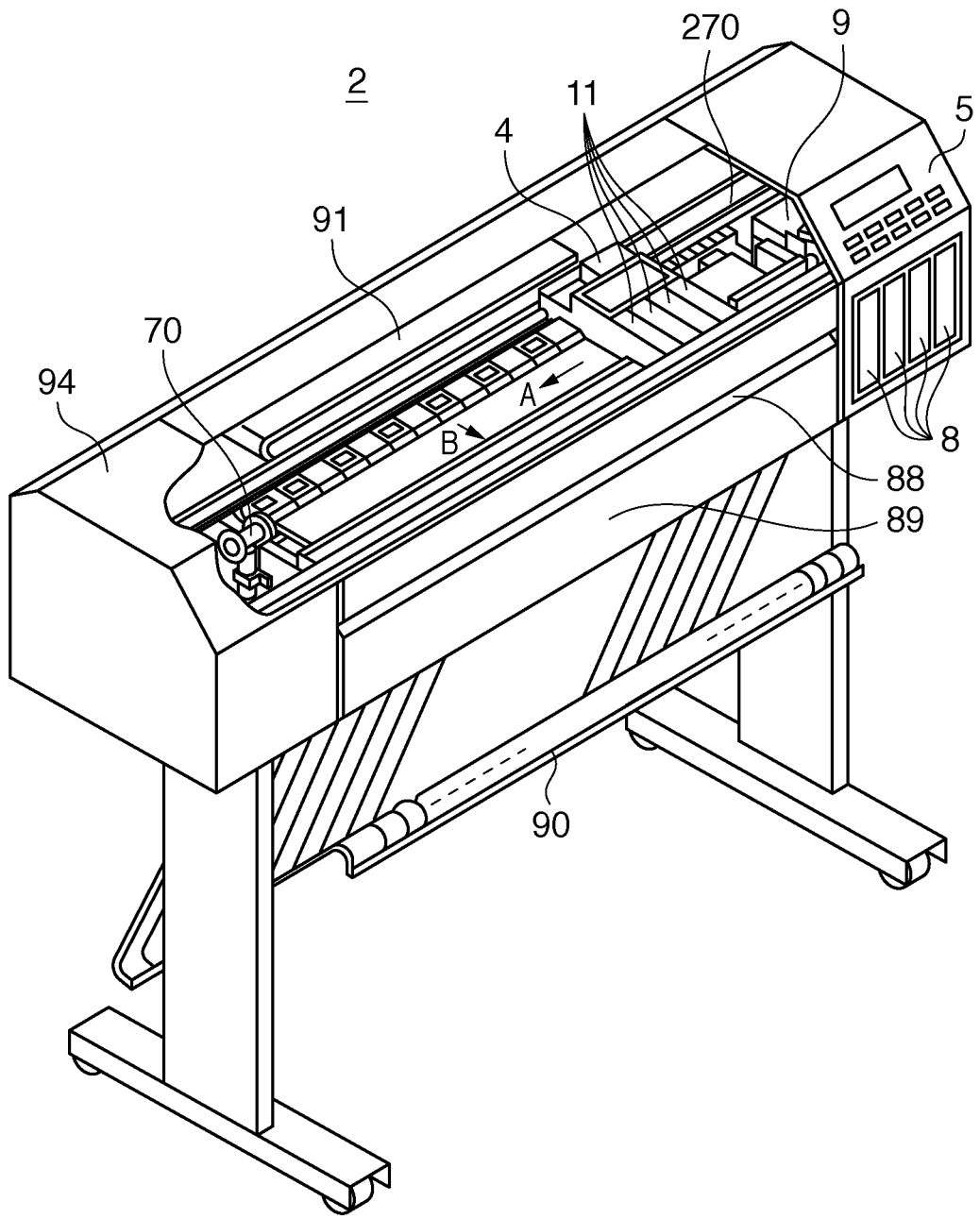
FIG. 3 is a perspective view showing a state in which the upper cover of the inkjet printer shown in FIG. 2 is removed.

FIG. 2 is a perspective view of the outer appearance of the inkjet printer (to be referred to as printing apparatus) 2 which builds the printing system. FIG. 3 is a perspective view showing a state in which the upper cover of the printing apparatus 2 shown in FIG. 2 is removed.

As shown in FIGS. 2 and 3, the printing apparatus 2 has a manual feed port 88 on its front surface, and a roll paper cassette 89 which can open to the front side is arranged below the manual feed port 88. A print medium such as print paper (to be referred to as a print medium or medium) is supplied from the manual feed port 88 or roll paper cassette 89 into the printing apparatus. The printing apparatus 2 includes an apparatus main body 94 supported by two legs 93, a stacker 90 which holds a discharged print medium, and an openable see-through upper cover 91. A control unit 5, the operation panel 12, an ink supply unit (not shown), and ink tanks 8 are arranged on the right side of the apparatus main body 94.

As shown in FIG. 3, the printing apparatus 2 includes the following components. More specifically, the printing apparatus 2 includes a conveyance roller 70 for conveying a print medium such as print paper in a direction (sub-scanning direction) indicated by an arrow B, and a carriage unit (to be referred to as a carriage) 4 which is guided and supported to be able to reciprocate in directions (indicated by an arrow A: main scanning direction) of the print medium width. The printing apparatus 2 further includes a carriage motor (not shown) and carriage belt (to be referred to as a belt) 270 for reciprocating the carriage 4 in the directions indicated by the arrow A, and an inkjet printhead (to be referred to as a printhead) 11 mounted on the carriage 4. A suction type ink recovery unit 9 is arranged at the end of the carriage scanning range to cancel an ink discharge failure caused by clogging of the orifice of the printhead 11 or the like. An ink supply tube (not shown) is connected to the printhead 11. The ink supply unit supplies ink from the ink tank 8 to the printhead 11 via the tube.

In this printing apparatus, the carriage 4 supports the printhead 11 made up of four heads corresponding to four color inks, in order to print in color on a print medium. More specifically, the printhead 11 is formed from a K (blacK) head for discharging K ink, a C (Cyan) head for discharging C ink, an M (Magenta) head for discharging M ink, and a Y (Yellow) head for discharging Y ink.

In printing, the conveyance roller 70 conveys a print medium to a predetermined print start position. Then, the carriage 4 scans the printhead 11 in the main scanning direction, and the conveyance roller 70 conveys the print medium in the sub-scanning direction. These operations are repeated to print on the entire print medium.

More specifically, the belt 270 and carriage motor (not shown) move the carriage 4 in the directions of the arrow A shown in FIG. 3 to print on a print medium. The carriage 4 then returns to a position (home position) where it stayed before scanning. The conveyance roller conveys the print medium in the sub-scanning direction (direction of the arrow B shown in FIG. 3). The carriage scans again in the directions of the arrow A in FIG. 3, printing an image, character, or the like on the print medium. After this operation is repeated to end printing on one print medium, the print medium is discharged into the stacker 90, completing printing on one medium. This printing apparatus can also perform reciprocal printing. More specifically, after the carriage 4 reaches the end of print paper opposite to the home position, the conveyance roller conveys the print medium by a predetermined amount in the sub-scanning direction. While scanning the carriage 4 in an opposite direction, the printing apparatus prints.

This apparatus can print on a print medium of a large size such as B0 or A0 size in cut sheet conversion.

<Outline of Functional Configuration of Printing System (FIG. 4)>

Figure 4:
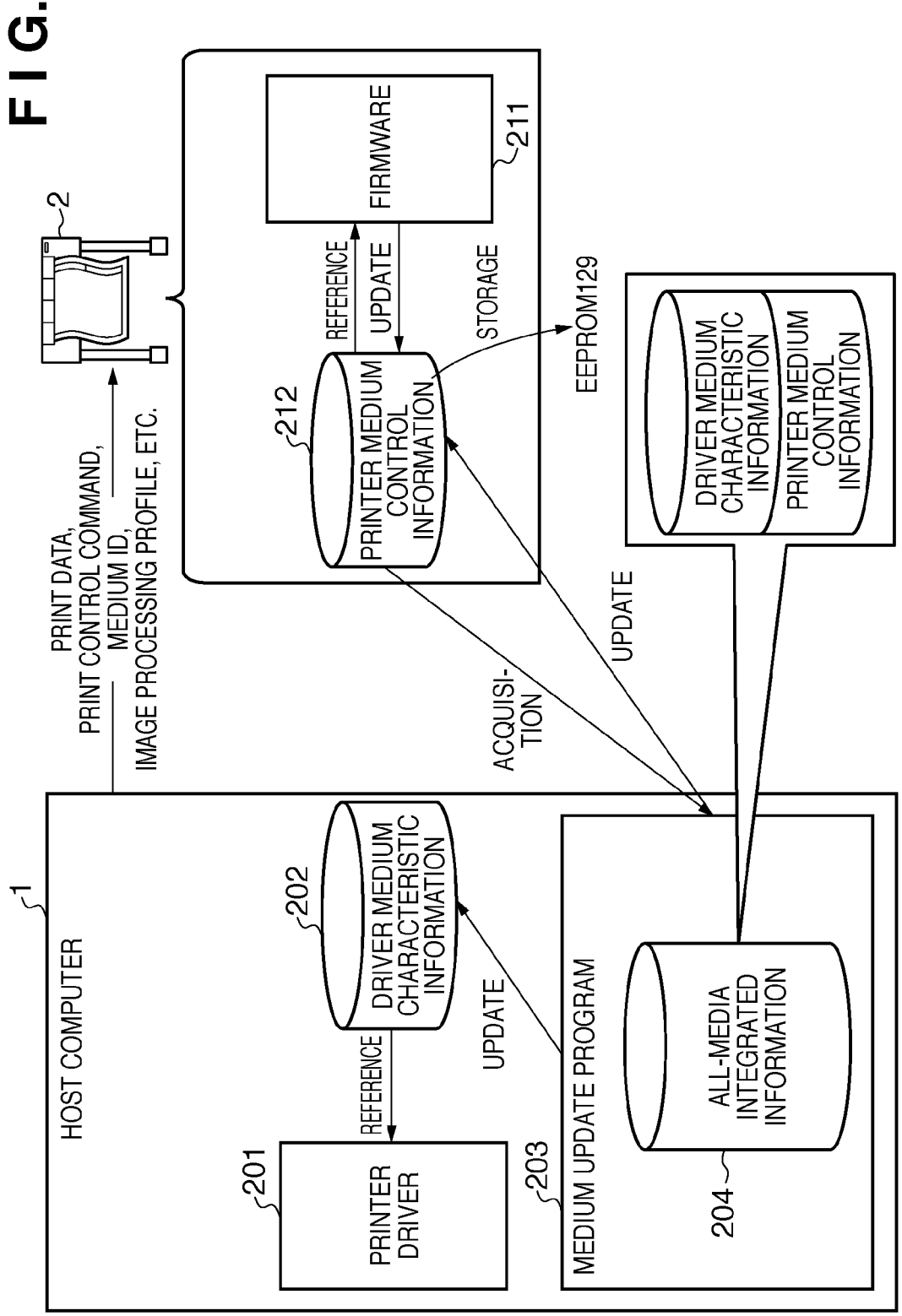
FIG. 4 is a block diagram showing an outline of the functional configuration of the printing system.

FIG. 4 is a block diagram showing an outline of the functional configuration of the printing system.

In an environment where the printing apparatus 2 is connected to the host 1 via the interface, as shown in FIG. 4, a printer driver 201 of the host 1 transmits, to the printing apparatus 2, information necessary for the printing apparatus 2 to print, including image data, a print control command, a medium ID, and an image processing profile. Based on the information transmitted from the printer driver 201, the printing apparatus 2 performs image processing and hardware control to achieve optimal printing.

The printer driver 201 holds driver medium characteristic information 202 serving as various parameters about a medium used by the printer driver 201, independently of the printer driver module. By referring to the driver medium characteristic information 202, the printer driver 201 controls whether or not to display a medium name and various print designations on a user interface so that the user can select his/her desirable one. Further, the printer driver 201 acquires parameters to be transmitted in printing.

An information update method for various kinds of control information using a media lineup in a printing apparatus examined upon conceiving the present invention will be explained as a reference example with reference to the accompanying drawings.

Figure 13:
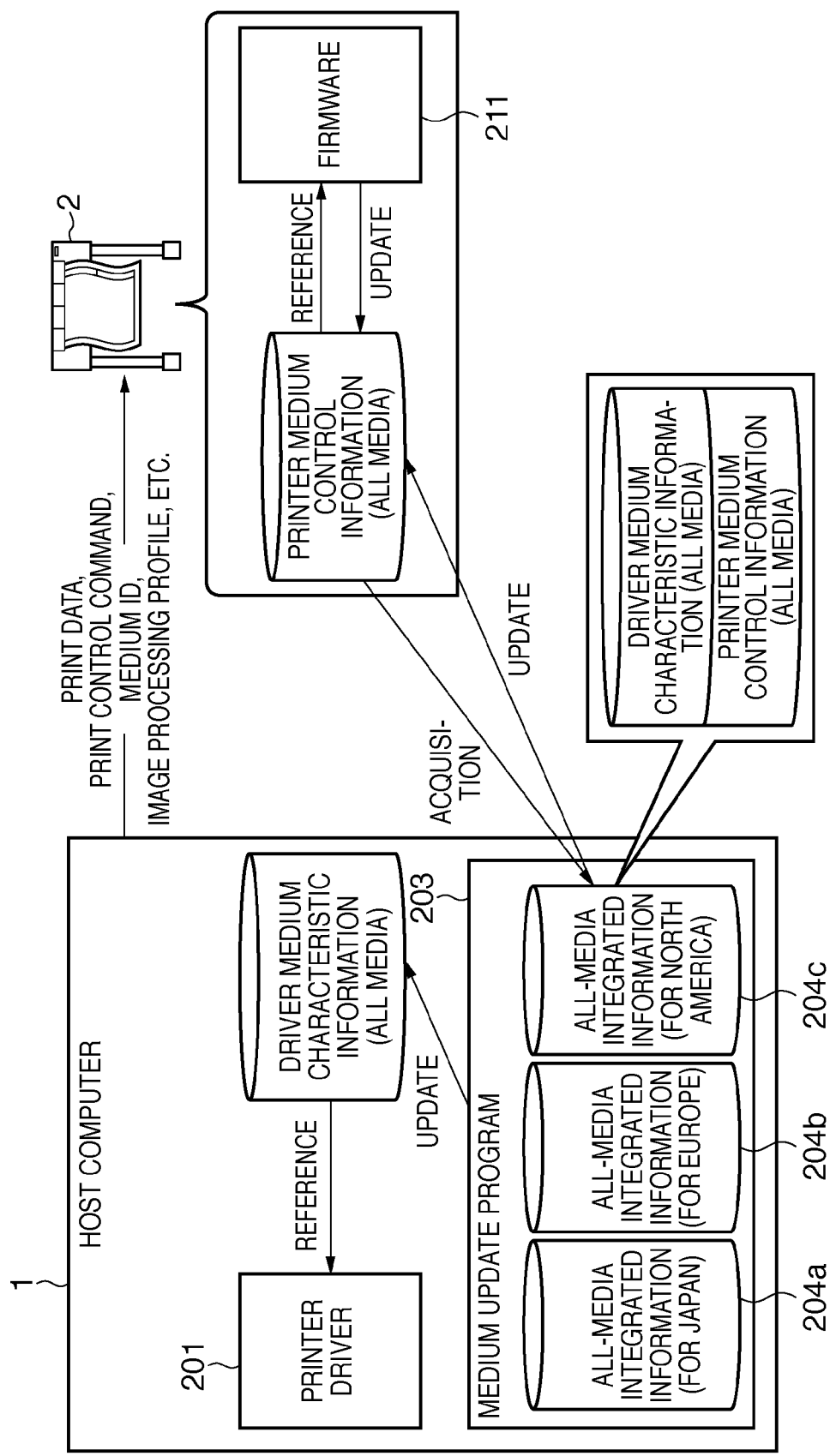
FIG. 13 is a block diagram showing an outline of the functional configuration of a printing system to be described as a reference example.

FIG. 13 is a block diagram showing an outline of the functional configuration of a printing system to be described as the reference example. In FIG. 13, the same reference numerals as those described in FIG. 4 denote the same parts, and a description thereof will not be repeated. FIG. 13 shows how to hold and update control information corresponding to a medium in an overall system made up of the printer 2 and host 1. As shown in FIG. 13, a medium update program 203 running on the host 1 holds pieces of all-media integrated information (media lineups) 204a, 204b, and 204c each obtained by integrating, for each area, pieces of control information of a plurality of media used in the area.

The all-media integrated information includes medium characteristic information used by a printer driver running on the host 1, and medium control information used by firmware 211 (program executed by the CPU or controller of the printer) of the printer 2. The medium characteristic information contains a color conversion parameter for converting the color of input image data designed for each medium into that of the color material (e.g., ink or toner) of a printer. In general, the medium characteristic information is stored in the form of a multidimensional lookup table. The medium control information contains a parameter set for each medium to correct a medium conveyance error, and parameters representing a conveyance speed permissible by the medium and the distance between the medium and a printhead for discharging ink when the printing apparatus is an inkjet printer.

Figure 14:
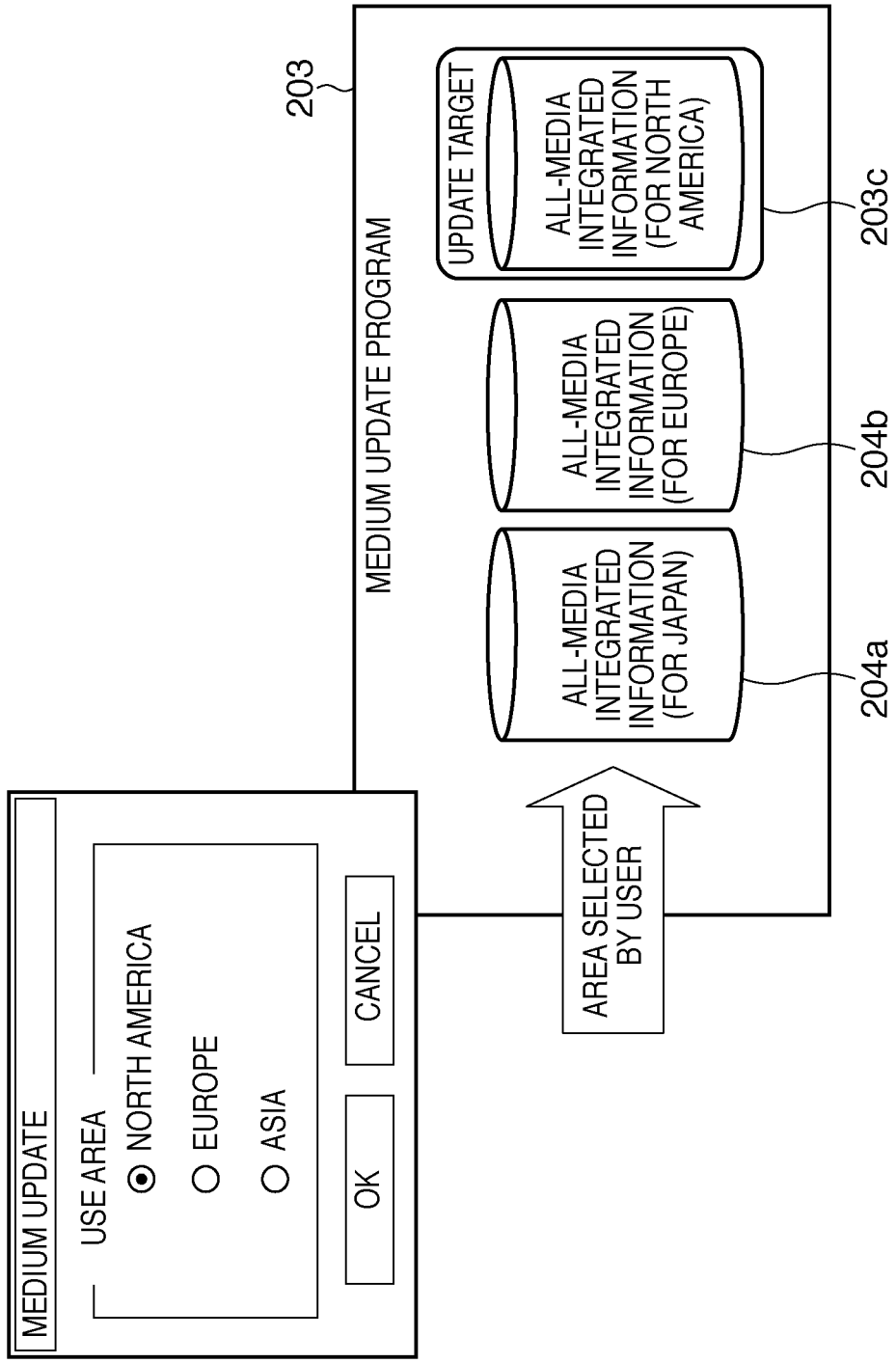
FIG. 14 is a view showing a state in which the medium update program holds a media lineup for each area.

FIG. 14 is a view showing a state in which the medium update program holds a media lineup for each area. FIG. 14 also shows a window used to select an update area by the user when updating the control information. In this example, "North America" is selected as an update area.

Figure 15:
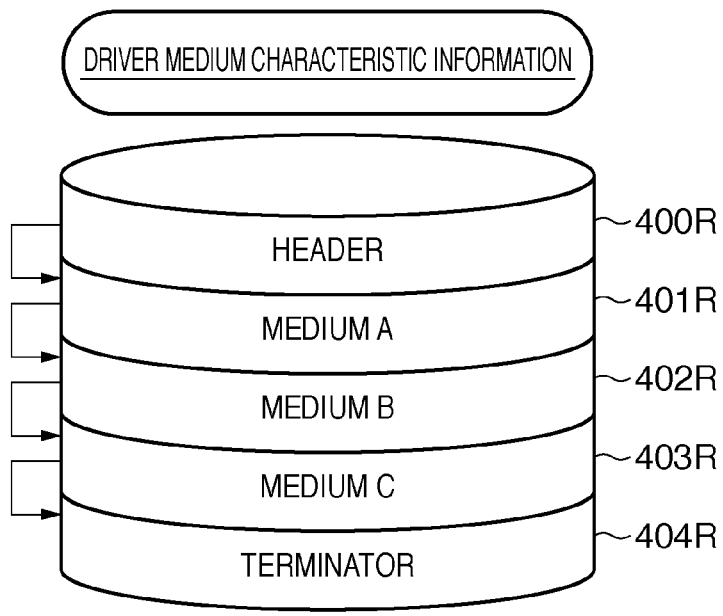
FIG. 15 is a view showing the structure of driver medium characteristic information to be described as the reference example.

FIG. 15 is a view showing the structure of driver medium characteristic information to be described as the reference example.

As shown in FIG. 15, the driver medium characteristic information starts from a header 400R. Then, pieces of medium characteristic information 401R, 402R, and 403R of respective media in a media lineup follow. A terminator 404R is set at the end. The data amounts of medium characteristic information of media A, B, and C are sometimes different.

Figure 16:
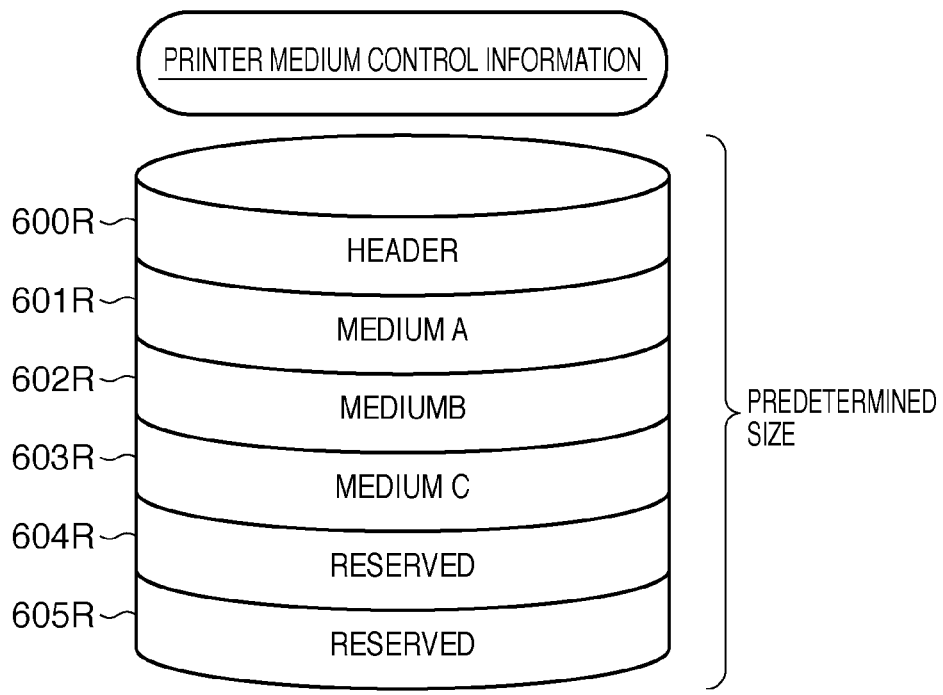
FIG. 16 is a view showing the structure of printer medium control information to be described as the reference example.

FIG. 16 is a view showing the structure of printer medium control information to be described as the reference example.

The printer medium control information has a predetermined size, and storage capacities assigned to the respective media are equal. In the example shown in FIG. 16, there are storage capacities for five media. Three of these storage capacities are used, and the remaining two are not used. As shown in FIG. 16, printer medium control information starts from a header 600R. Then, pieces of medium control information 601R, 602R, and 603R of respective media in a media lineup follow. Unused areas remain as reserved areas 604R and 605R. Medium control information can be added by the number of reserved areas.

Processing to update medium information according to the reference example will be explained.

First, the user selects an area of use from the medium update window shown in FIG. 14 and presses an OK button. Then, the medium update program 203 updates driver medium characteristic information (pieces of driver medium characteristic information of all media) in the host 1 by using all-media integrated information of the area selected by the user. At this time, the medium update program 203 stores the pieces of updated driver medium characteristic information of all media in the RAM, hard disk (HDD), or the like of the host 1. Further, the medium update program 203 transmits, to the printer 2, pieces of medium control information (all media) of the area selected by the user, causing the printer 2 to update the pieces of medium control information of all media stored in the storage unit (e.g., RAM or HDD) of the printer 2.

Embodiments of the present invention will be explained, including the problem of the configuration examined as the reference example.

First Embodiment

Figure 5:
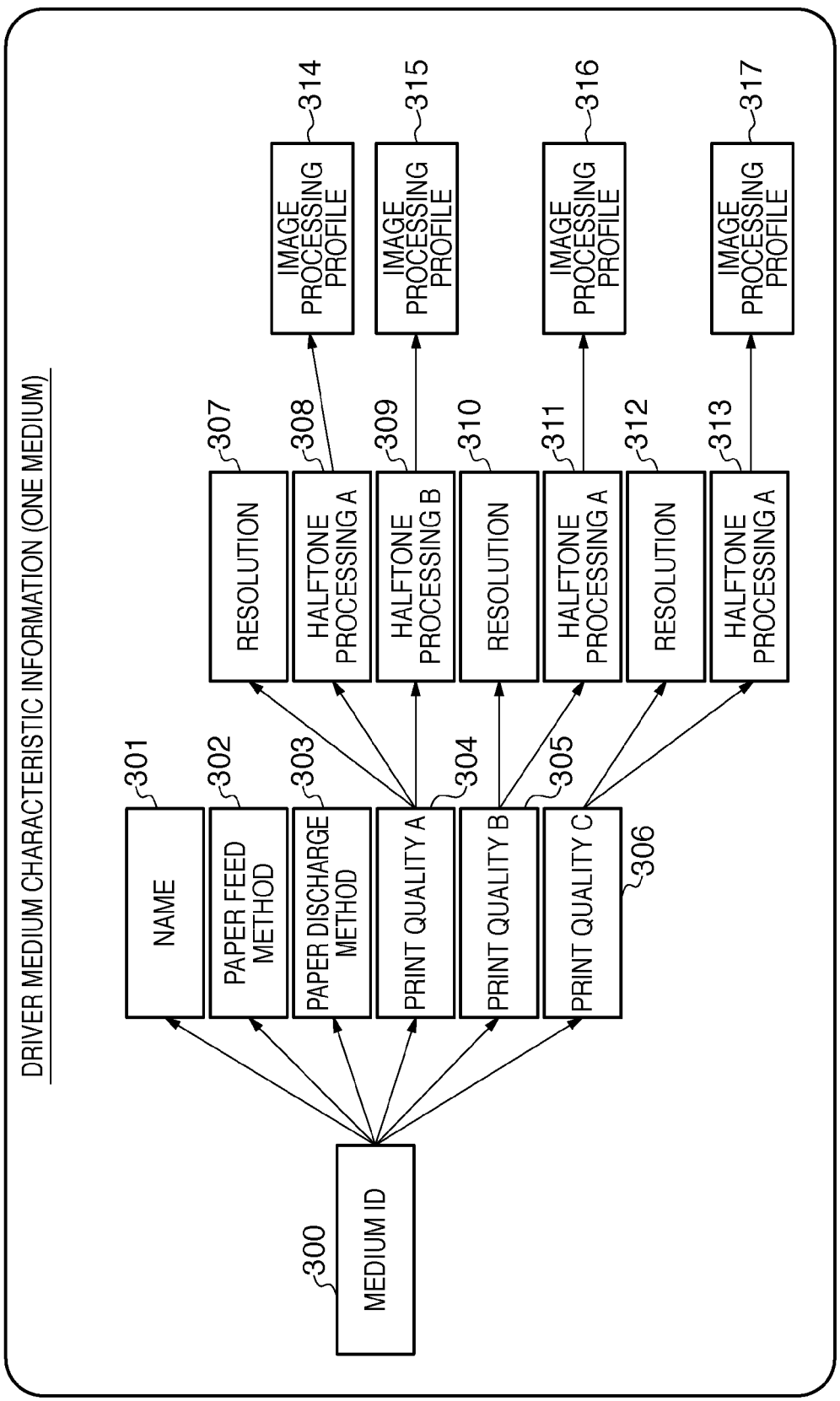
FIG. 5 is a block diagram showing the detailed structure of driver medium characteristic information 202.

FIG. 5 is a block diagram showing the detailed structure of driver medium characteristic information 202.

In FIG. 5, reference numeral 300 denotes a medium ID serving as identification information of a medium; and 301, information of a medium name (character string) used on the user interface of a printer driver 201. Reference numeral 302 denotes information of a paper feed method capable of feeding the medium; and 303, information of a paper discharge method capable of discharging the medium. Reference numerals 304 to 306 denote print quality parameters corresponding to the medium. These parameters 304 to 306 represent that three print qualities A, B, and C are selectable for this medium.

Reference numeral 307 denotes information of a resolution used at the print quality A 304. Reference numerals 310 and 312 also denote pieces of information of resolutions used at the corresponding print quality B 305 and print quality C 306. Reference numerals 308 and 309 denote pieces of information of halftone processing used at the print quality A 304. This means that two types of halftone processing methods, that is, the halftone processing A 308 and halftone processing B 309 are selectable for the print quality A 304. Similarly, reference numerals 311 and 313 denote pieces of information of halftone processing used at the corresponding print quality B 305 and print quality C 306.

Reference numeral 314 denotes an image processing profile used when the print quality A 304 and halftone processing A 308 are designated. This profile contains a 3D LUT (Look Up Table) for converting an RGB color space handled by a host 1 into a CMY color space handled by a printing apparatus 2, and various profiles used for color processes such as density adjustment and brightness adjustment. Reference numerals 315 to 317 also denote image processing profiles used when the print quality A 304 and halftone processing B 309 are selected, the print quality B 305 and halftone processing A 311 are selected, and the print quality C 306 and halftone processing A 313 are selected, respectively.

Figure 6:
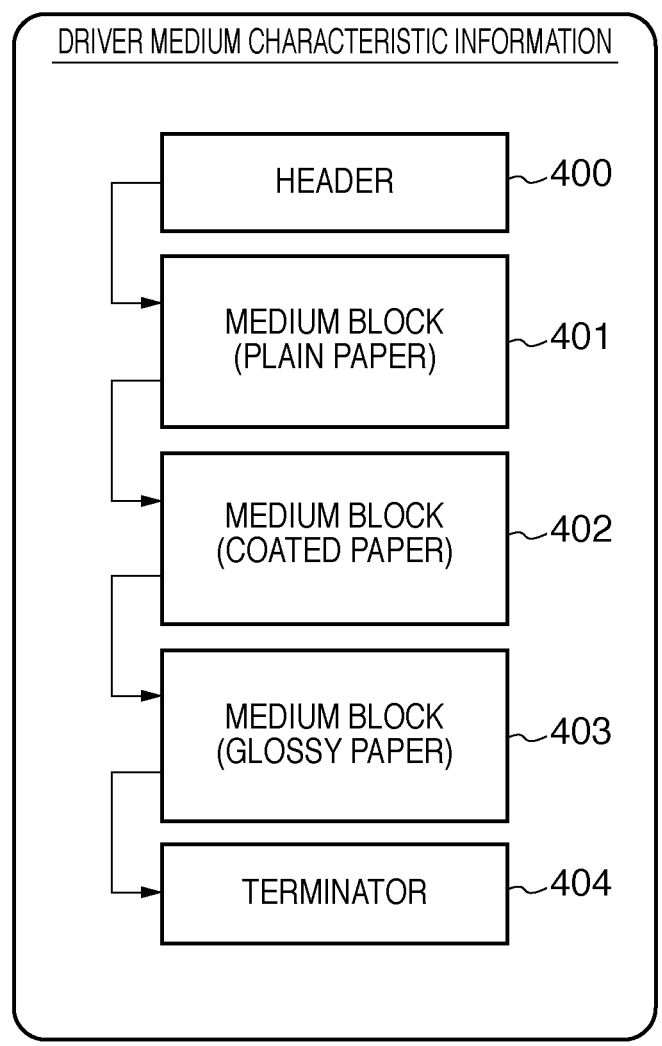
FIG. 6 is a block diagram showing linkage of parameters defined for respective media.

FIG. 6 is a block diagram showing linkage of parameters defined for respective media.

By linking parameters as shown in FIG. 6, the driver medium characteristic information 202 forms characteristic information of all media supported by the printer driver 201.

In FIG. 6, reference numeral 400 denotes a header which stores a signature, date, version, and the like; and 401 to 403, medium blocks corresponding to respective media. In this example, the medium blocks of plain paper, coated paper, and glossy paper are linked. Reference numeral 404 denotes a terminator representing the termination of the driver medium characteristic information 202.

Referring back to FIG. 2, firmware 211 of the printing apparatus 2 holds, in an EEPROM 129, printer medium control information 212 serving as various parameters concerning media used by the firmware 211, independently of the firmware module. The printer medium control information is separated from the firmware 211. By referring to the printer medium control information 212, the firmware 211 controls an operation panel 12 and acquires parameters used for print control in printing. Changeable parameters can be updated by settings from the operation panel 12.

Figure 7:
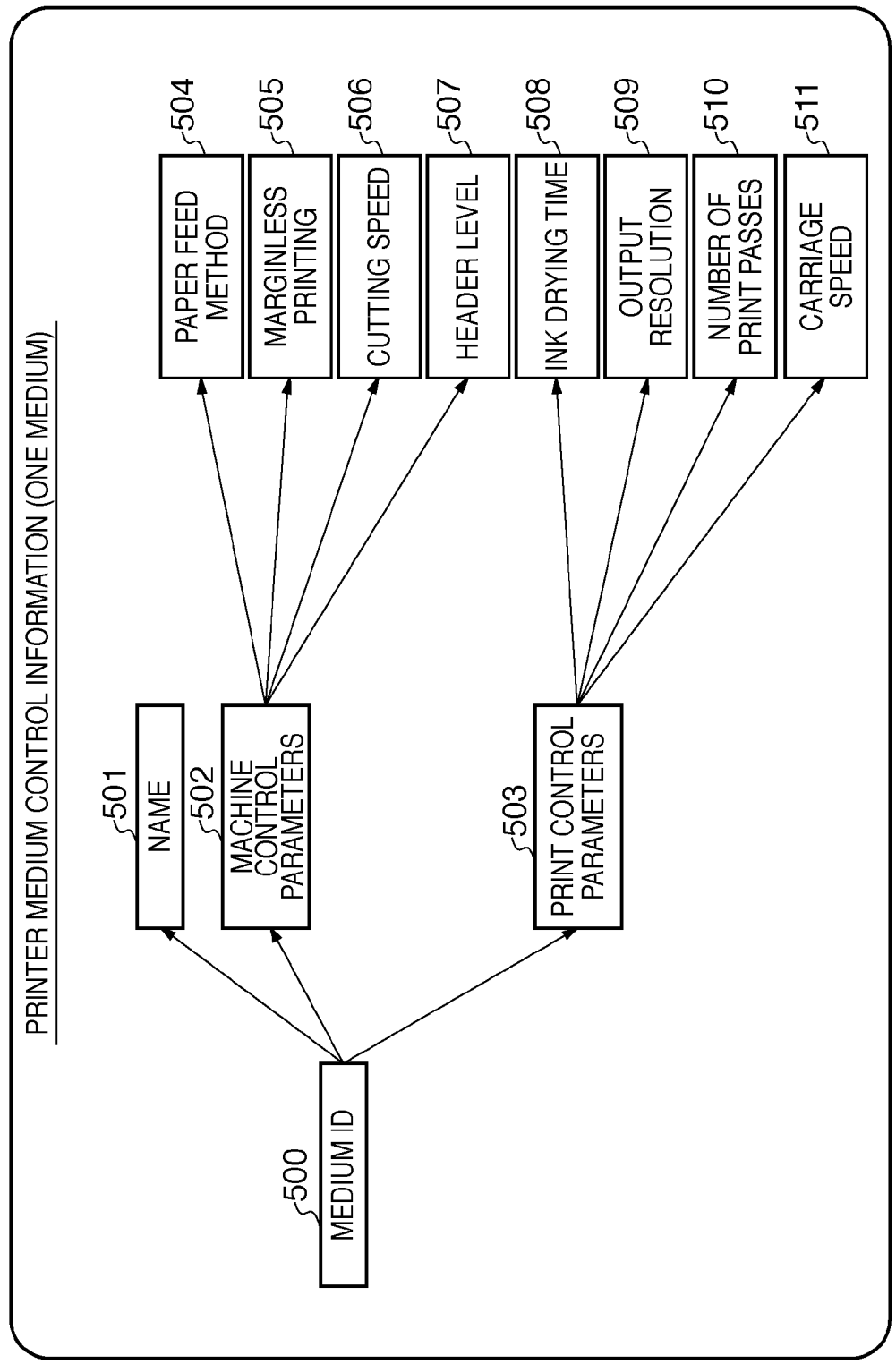
FIG. 7 is a block diagram showing the detailed structure of printer medium control information 212.

FIG. 7 is a block diagram showing the detailed structure of the printer medium control information 212.

In FIG. 7, reference numeral 500 denotes a medium ID serving as identification information of a medium; 501, information of a medium name (character string) used on the operation panel 12; 502, machine control parameters used for display on the operation panel 12 and printing; and 503, print control parameters used for display on the operation panel 12 and printing.

Reference numeral 504 denotes information of a paper feed method capable of feeding the medium; 505, information representing whether or not the medium enables marginless printing; and 506, information of a cutting speed when cutting roll paper of the medium.

Reference numeral 507 denotes information of a printhead level from the printing surface of the medium; 508, information of a standby time for drying ink on the medium; and 509, information of a resolution at which the printhead prints on the medium. Reference numeral 510 denotes information of the number of passes in multipass printing of the medium; and 511, information of a carriage moving speed for moving the printhead.

Figure 8:
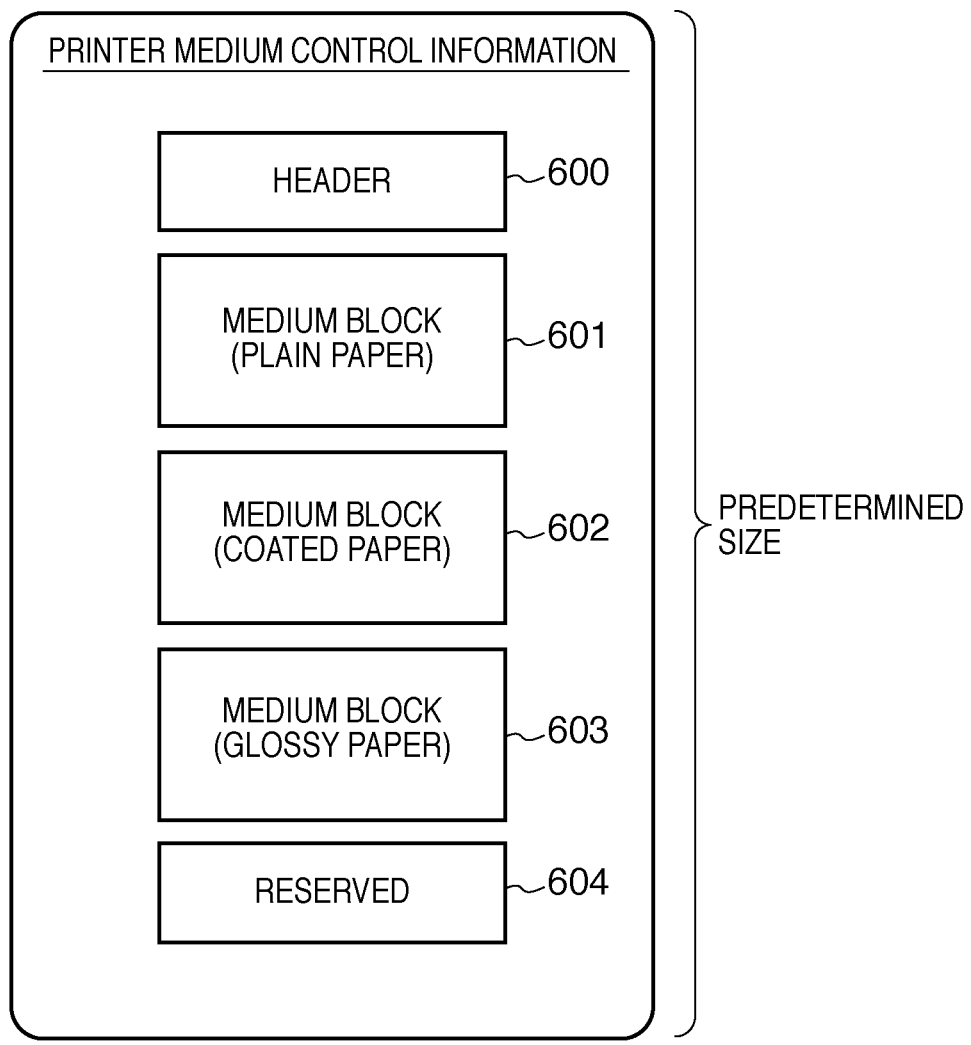
FIG. 8 is a block diagram showing linkage of parameters defined for respective media.

FIG. 8 is a block diagram showing linkage of parameters defined for respective media.

By linking parameters as shown in FIG. 8, the printer medium control information 212 forms control information of all media supported by the printing apparatus 2. Since the capacity of the storage device such as the EEPROM 129 is limited, the printer medium control information 212 has a predetermined size in the embodiment. In FIG. 8, reference numeral 600 denotes a header which stores a signature, date, version, the number of media, and the like; and 601 to 603, medium blocks corresponding to respective media. In this example, the medium blocks of plain paper, coated paper, and glossy paper are linked. Reference numeral 604 denotes a reserved area for a medium to be added later. All the medium blocks 601 to 603 and reserved area 604 have the same size (storage capacity).

As shown in FIG. 4, a medium update program 203 holds all-media integrated information 204 which integrates all pieces of driver medium characteristic information 202 and all pieces of printer medium control information 212 including those for a medium to be updated. Unlike the reference example, the all-media integrated information 204 is created by connecting pieces of one-medium integrated information by the medium update program 203 according to a method to be described later.

The medium update program 203 updates the driver medium characteristic information 202 and printer medium control information 212 by using the all-media integrated information 204.

In a configuration in which a plurality of hosts and a plurality of printing apparatuses are connected via a network, another host may update the printer medium control information 212. Considering this, the medium update program 203 acquires the printer medium control information 212 from the printing apparatus 2 prior to update, and compares it with printer medium control information in the all-media integrated information 204 to be updated. If these two pieces of printer medium control information are identical to each other, it is considered that another host on the network has already updated the printer medium control information 212. Thus, the medium update program 203 updates only the driver medium characteristic information 202 without updating the printer medium control information 212.

Figure 9:
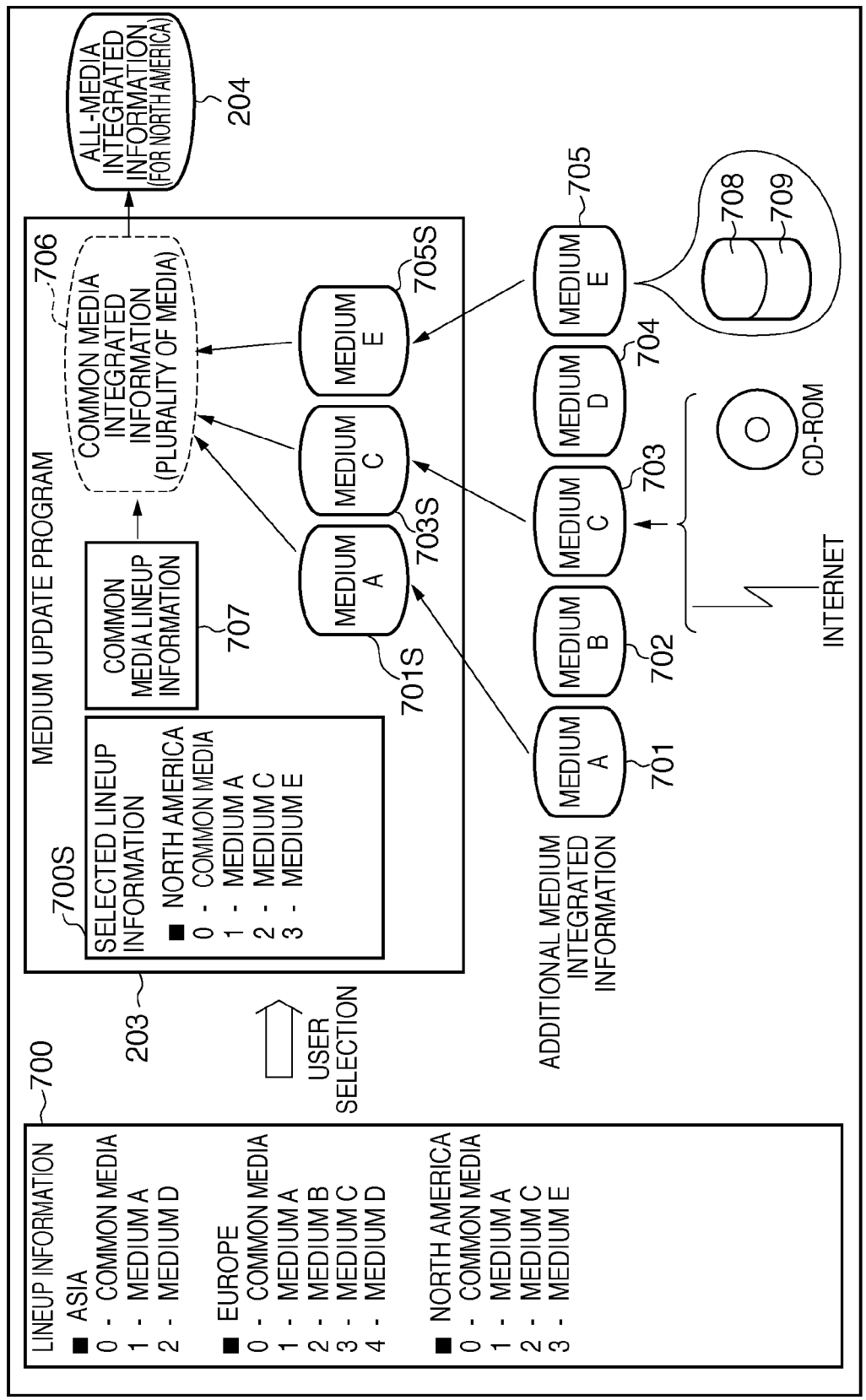
FIG. 9 is a view showing an outline of a medium update program.

FIG. 9 is a view showing an outline of the medium update program.

The medium update program 203 in this example changes a media lineup depending on an area where the printing apparatus 2 is sold and used.

FIG. 10 is a view showing a menu window displayed on a display 107 of the host 1. This menu appears on the display of the host 1 when executing the medium update program, and prompts the user to select the use area of the printing apparatus 2. In this example, "North America" is selected. The user selects and designates the area with a keyboard or pointing device.

The all-media integrated information 204 (FIG. 4) is created as shown in FIG. 9. The medium update program 203 fetches lineup information 700S corresponding to an area selected by the user from lineup information 700 describing a lineup of media in each area. The medium update program 203 selectively fetches medium integrated information made up of driver medium characteristic information 708 and printer medium control information 709 of each medium included in the selected lineup information 700S. In this way, the medium update program 203 fetches information on a medium which may be changed depending on the area. FIG. 9 shows five pieces of medium integrated information 701 to 705 for additional media A to E. These pieces of medium integrated information are downloaded via the Internet or provided by a medium such as a CD-ROM.

FIG. 9 shows a configuration in which pieces of additional medium integrated information (one-medium integrated information) are selected from the outside of the medium update program. Instead, pieces of additional medium integrated information (one-medium integrated information) may be held in the medium update program 203 to add a target one from the pieces of held medium integrated information.

Figure 17:
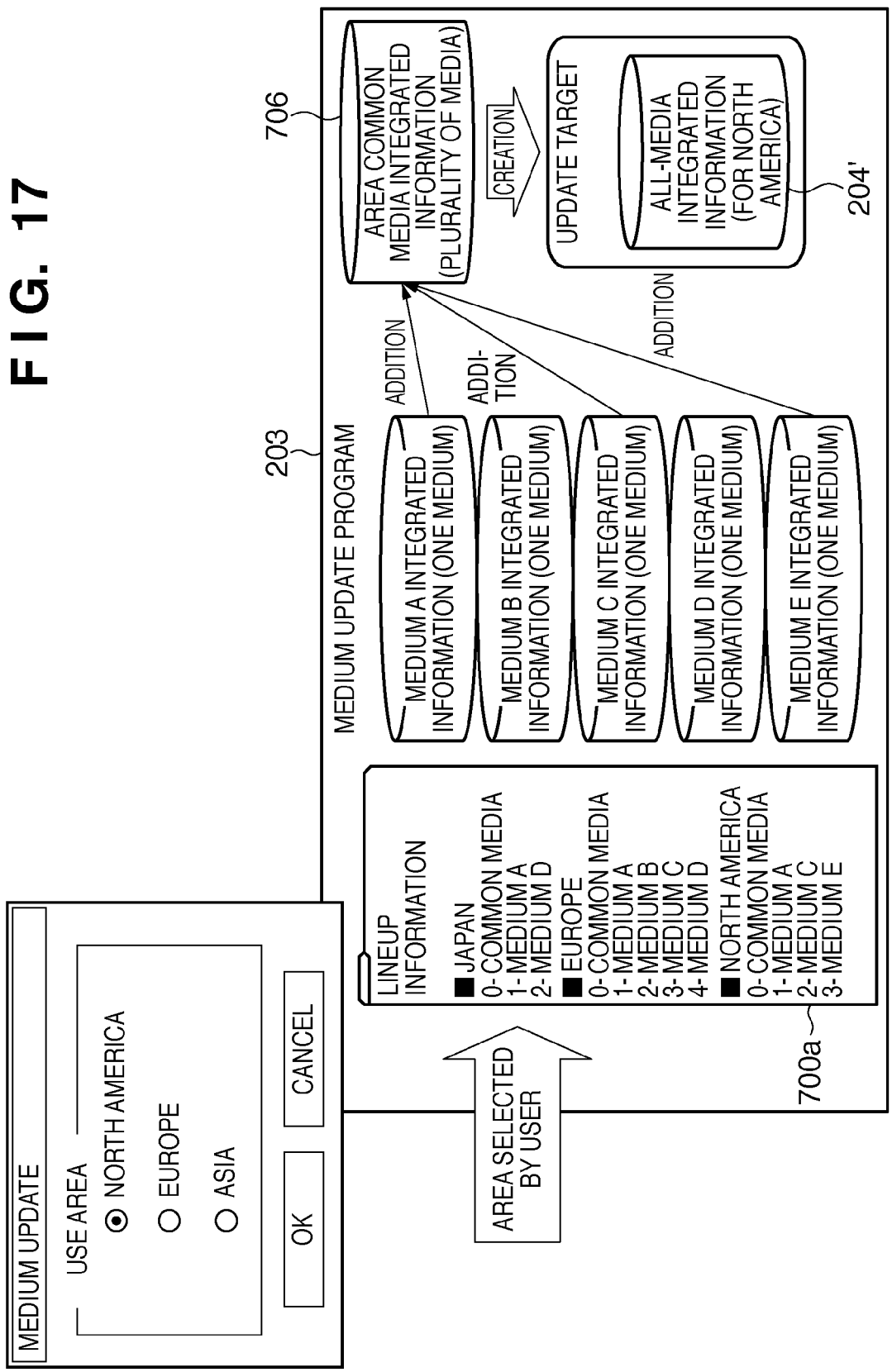
FIG. 17 is a view showing an outline of another configuration of the medium update program.

FIG. 17 is a view showing an outline of another configuration of the medium update program.

In this configuration, the medium update program 203 internally holds lineup information 700a. According to a selection instruction from the user, the medium update program 203 selects information to be added from the held lineup information, and internally holds all-media integrated information 204' to be updated.

Figure 18:
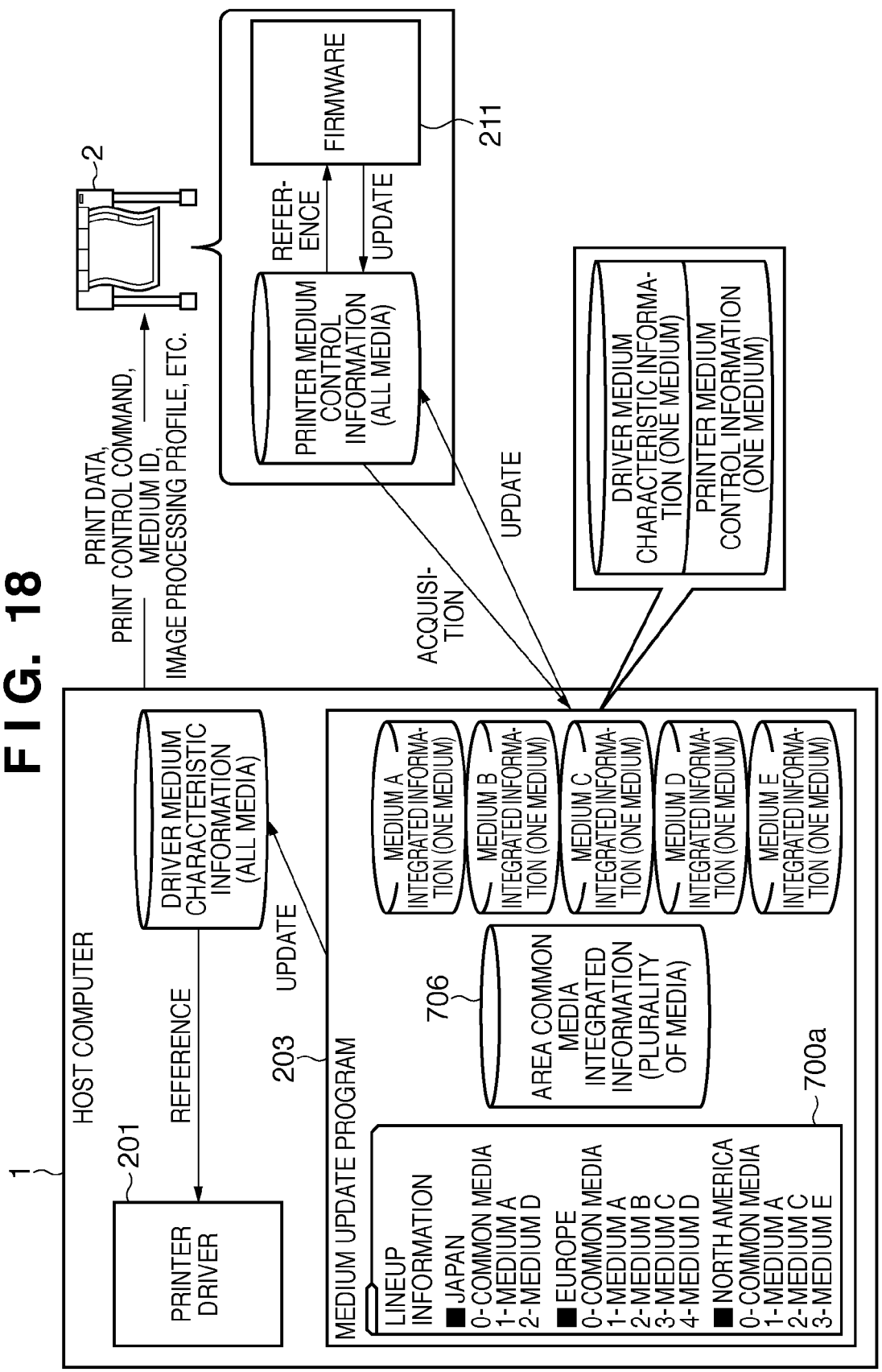
FIG. 18 is a view showing a functional configuration when the medium update program shown in FIG. 17 is used in the printing system shown in FIG. 4.

FIG. 18 is a view showing a functional configuration when the medium update program shown in FIG. 17 is used in the printing system shown in FIG. 4.

In the configuration shown in FIG. 9, the medium update program 203 selects and fetches pieces of medium integrated information 701S, 703S, and 705S corresponding to media A, C, and E. Also, the medium update program 203 holds, as common media lineup information 707, information on media which do not change depending on the area. Based on the common media lineup information 707, the medium update program 203 creates common media integrated information 706. Further, the medium update program 203 connects the common media integrated information 706 and the pieces of selected and fetched medium integrated information 701S, 703S and 705S corresponding to media A, C, and E, thereby creating the all-media integrated information 204.

In the example shown in FIGS. 9 and 10, the user selects the use area of a printer and all-media integrated information is created. However, the present invention is not limited to this, and all-media integrated information can also be created for each application purpose. For example, the display 107 of the host displays a window which prompts the user to select the application purpose of a printer such as CAD application or graphic application. The medium update program 203 holds lineup information 700 corresponding to application purposes displayed on the window. Based on lineup information 700S on an application purpose selected by the user, the medium update program 203 creates all-media integrated information. In this case, "North America", "Europe", "Asia", "Japan", "for CAD", "for graphics", and the like in the lineup information 700 held in the medium update program 203 are conditions, one of which is selected by the user. The user inputs these conditions by operating an operation unit 104.

Figure 11:
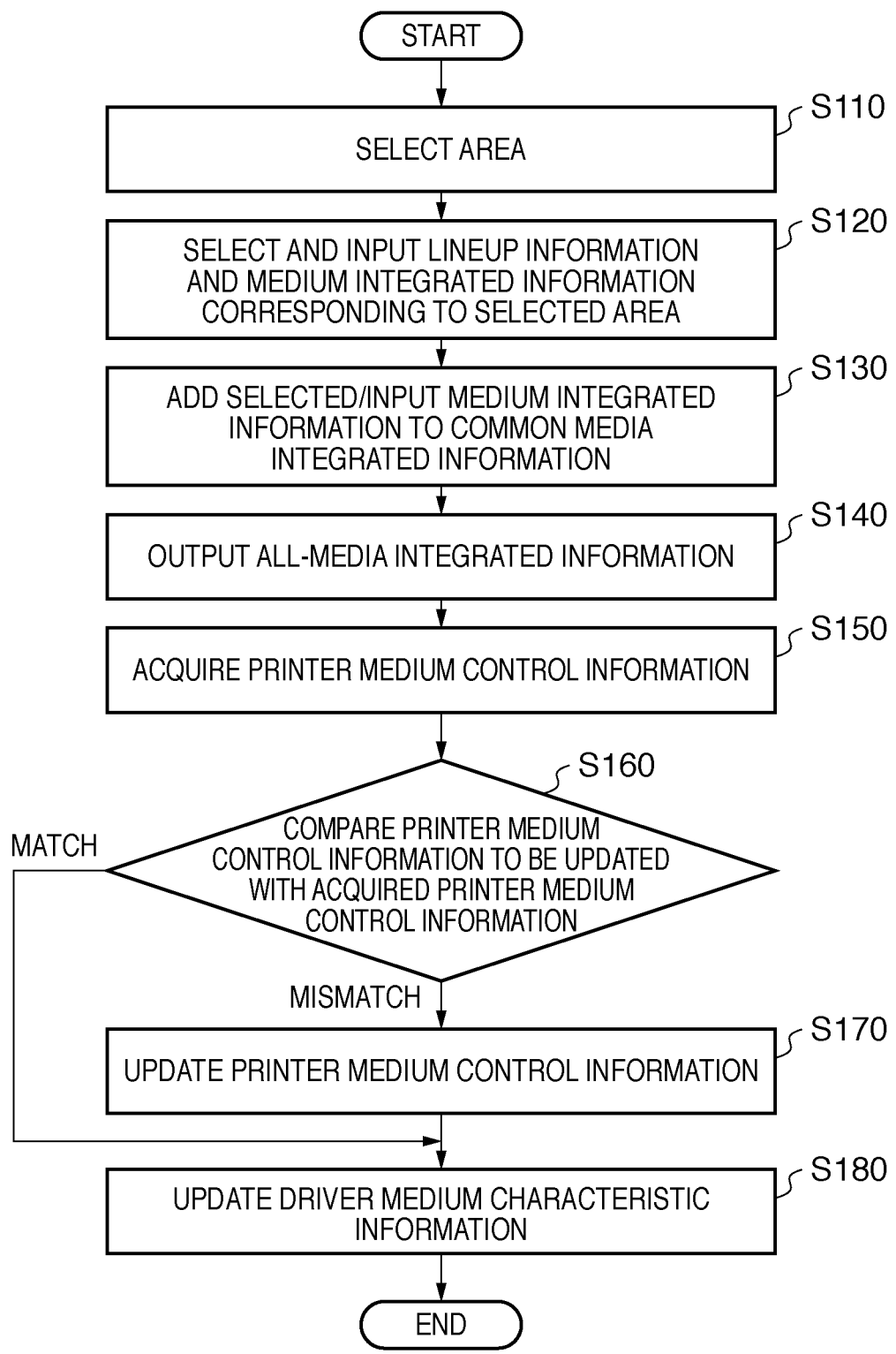
FIG. 11 is a flowchart showing update processing by a medium update program 203.

FIG. 11 is a flowchart showing the procedures of information update processing by the medium update program 203. A program shown in this flowchart is installed in the host 1 and stored in an external storage device 109. Then, a CPU 101 reads out the program to a RAM 102 and executes it.

In step S110, the user selects a use area via the user interface shown in FIG. 10.

In response to the selection, the medium update program 203 selects and inputs information corresponding to the area selected by the user from the lineup information 700, searches the pieces of medium integrated information 701 to 705 for necessary medium integrated information, and selects and inputs the necessary one in step S120. In the example shown in FIGS. 9 and 10, the user selects "North America", so the additional medium A integrated information 701, additional medium C integrated information 703, and additional medium E integrated information 705 are selected and input.

In step S130, the medium update program 203 adds the common media lineup information 707 and the selected one-medium integrated information in an order described in the selected lineup information 700S. In this example, the additional medium A integrated information 701, additional medium C integrated information 703, and additional medium E integrated information 705 are added in an order named to the common media integrated information 706.

In step S140, the medium update program 203 outputs the common media integrated information 706 as the all-media integrated information (for North America) 204.

As described above, in step S150, the medium update program 203 acquires the printer medium control information 212 from the printing apparatus 2 before updating medium characteristic information, as described above. In step S160, the medium update program 203 compares printer medium control information in the all-media integrated information 204 output from the medium update program for use in update with printer medium control information in the printer medium control information 212 acquired from the printer 2.

If the medium update program 203 determines that these two pieces of printer medium control information match each other, it is considered that another host on the network has already updated the printer medium control information. Thus, the process advances to step S180. The medium update program 203 updates only the driver medium characteristic information 202 without updating the printer medium control information 212. If the medium update program 203, on the other hand, determines that these two pieces of printer medium control information do not match each other, the process advances to step S170 to transfer the printer medium control information 212 in the created all-media integrated information to the printer 2 and instruct the printer 2 to update the printer medium control information 212. The process then advances to step S180 to update the driver medium characteristic information 202. At this time, the printer 2 updates the printer medium control information 212 held in it by using the printer medium control information transferred from the host 1. In the printer 2, a CPU 124 updates the printer medium control information 212 stored in the EEPROM 129 by using the printer medium control information transferred from the host 1.

Figure 19:
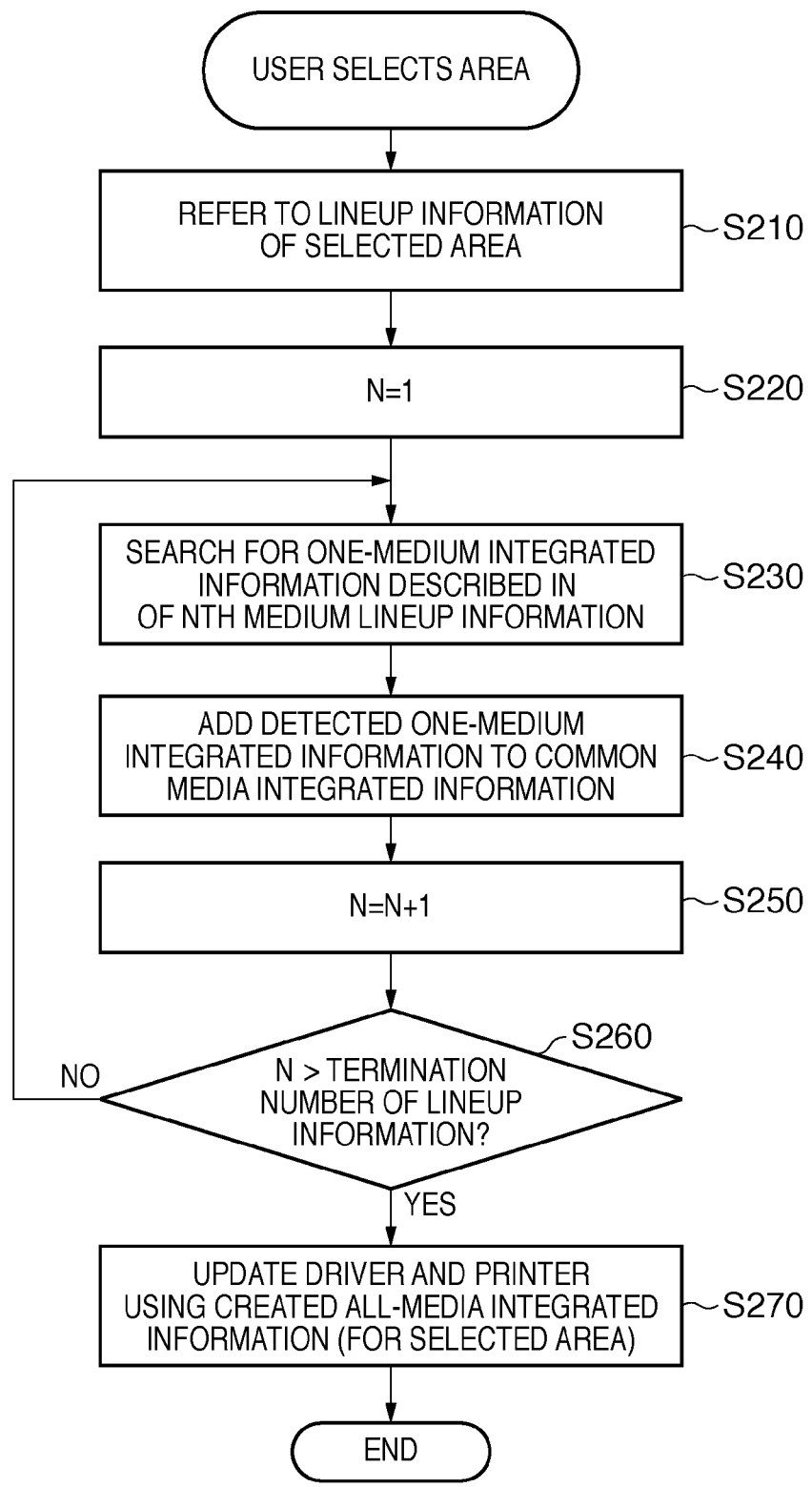
FIG. 19 is a flowchart showing details of processing of step S130 shown in FIG. 11.

FIG. 19 is a flowchart showing details of the processing procedures of step S130 shown in FIG. 11.

In step S210, the medium update program 203 refers to the lineup information 700S of the area selected by the user and compares it with printer medium control information acquired from the printer 2. In step S220, the medium update program 203 initializes the counter (N) value to N=1 in order to arrange pieces of one-medium integrated information one by one.

In step S230, the medium update program 203 searches for one-medium integrated information of the Nth medium described in the lineup information 700S. In step S240, the medium update program 203 adds the detected one-medium integrated information to common media integrated information. In step S250, the medium update program 203 increments the counter (N) value by "+1". In step S260, the medium update program 203 determines whether or not the counter (N) value has exceeded the termination number in the lineup information 700S. If the medium update program 203 determines that the N value has exceeded the termination number, the process advances to step S270; if the N value has not exceeded the termination number, returns to step S230.

In step S270, the medium update program 203 updates driver medium characteristic information and printer medium control information by using the created all-media integrated information. The processing in step S270 corresponds to steps S170 and 5180 in FIG. 11.

According to the above-described embodiment, the host updates driver medium characteristic information held independently of the printer driver module, in order to newly cope with a medium whose sales period does not coincide with that of the printing apparatus (a medium newly released after the printer comes on the market). The printing apparatus also updates printer medium control information held independently of firmware since the driver medium characteristic information newly copes with a medium whose sales period does not coincide with that of the printing apparatus. In this manner, a variety of newly available media can be supported.

As examined using the reference example, when the same medium exists in media lineups, medium characteristic information and medium control information of the medium that correspond to common media information in the first embodiment are redundantly stored in the respective media lineups. In the first embodiment, corresponding medium information is added in both a case in which Europe is selected and a case in which North America is selected. To the contrary, in the reference example, pieces of medium characteristic information and medium control information of media A and C are stored in both all-media integrated information for Europe and that for North America. Thus, one-medium integrated information is redundantly stored in the media lineups.

However, according to the above-described embodiment, in medium integrated information update processing, the medium update program fetches only lineup information and additional medium integrated information necessary for processing to create update information. Thus, compared to the reference example, the program can be downsized. Information common to a plurality of media is shared as common media integrated information. The amount of information handled decreases, contributing to the reduction of the program size. Since the medium update program is downsized, distribution of it via the network is completed within a shorter time.

The medium update program dynamically updates a media lineup, so the program developer need not create each lineup in advance. This leads to a smaller number of development steps and a lower development cost of the medium update program.

Second Embodiment

A medium update program which executes processing different from that in the first embodiment will be exemplified. To avoid repetition, only a difference of the second embodiment from the first embodiment will be explained.

Figure 12:
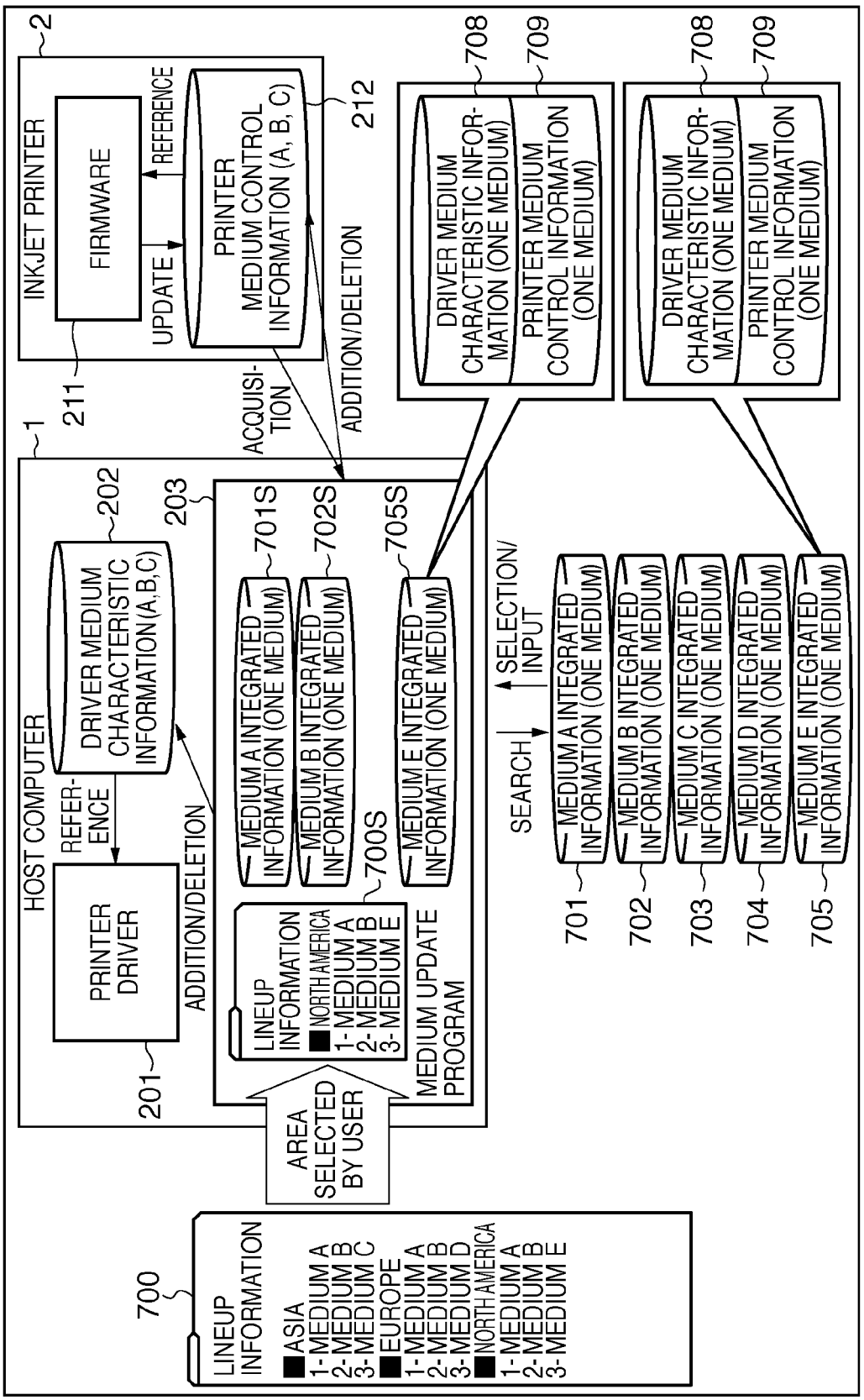
FIG. 12 is a block diagram showing an outline of a medium update program according to another embodiment.

FIG. 12 is a block diagram showing an outline of processing by the medium update program according to the second embodiment.

Similar to the foregoing embodiment, a medium update program 203 according to the second embodiment changes a media lineup depending on a selected area. The user selects a use area via a user interface as shown in FIG. 10.

In the second embodiment, the medium update program 203 directly updates driver medium characteristic information 202 and printer medium control information 212 by using medium integrated information held in it. Prior to update, the medium update program 203 acquires the printer medium control information 212 from a printing apparatus 2. The embodiment assumes that the printing apparatus 2 holds pieces of printer medium control information corresponding to media A, B, and C before update, and a host 1 holds pieces of driver medium characteristic information corresponding to media A, B, and C as well.

Also in this embodiment, medium integrated information on each medium is an integration of driver medium characteristic information 708 and printer medium control information 709.

First, the medium update program 203 selects necessary lineup information 700S from lineup information 700 in accordance with an area selected by the user. The medium update program 203 searches the selected lineup information 700S for corresponding medium integrated information, and inputs the retrieved medium integrated information. In the example of FIG. 10, the user selects "North America", so medium A integrated information 701S, medium B integrated information 702S, and medium E integrated information 705S are selected and input out of five pieces of medium integrated information 701 to 705 shown in FIG. 12.

Then, the medium update program 203 adds/deletes/changes pieces of driver medium characteristic information in the pieces of input medium integrated information to/from/in the driver medium characteristic information 202 in an order described in the lineup information 700S. In addition/deletion/change, the medium update program 203 compares the currently held driver medium characteristic information 202 with the selected/input medium integrated information. It is then turned out that pieces of driver medium characteristic information for media A, B, and E are necessary in the selected area (in this case "North America") and currently held driver medium characteristic information for medium C is unnecessary. Thus, the medium update program 203 deletes the driver medium characteristic information for medium C from the driver medium characteristic information 202, and adds the driver characteristic information for medium E.

Similarly, the medium update program 203 adds/deletes/changes pieces of printer medium control information in the pieces of input medium integrated information to/from/in the printer medium control information 212 acquired from the printing apparatus 2 in an order described in the lineup information 700S. In the embodiment, the medium update program 203 deletes printer medium control information for medium C from the printer medium control information 212, and adds printer control information for medium E. The medium update program 203 transfers, to the printer 2, the printer medium control information 212 obtained by deleting the printer medium control information for medium C and adding the printer control information for medium E, and causes the printing apparatus 2 to update it. By this processing, the medium update program 203 updates the driver medium characteristic information 202 and printer medium control information 212.

According to the first and second embodiments described above, even when the same medium is included in media lineups, one-medium information (driver medium characteristic information and printer medium control information) need not be redundantly held, unlike media lineups in the reference example. This can prevent an increase in medium update program size. The smaller-size medium update program can contribute to shortening the time taken to download the program in distribution of the medium update program via the network. When distributing the medium update program stored in a storage medium such as a DVD-ROM, the number of storage media can be decreased, contributing to reducing the cost.

In the above-described first and second embodiments, the medium update program changes a media lineup in accordance with a selected area. However, the present invention is not limited to this. For example, information serving as a criterion for updating media lineup information is not limited to a selected area, but may also be at least one of an application purpose, valid period, printer driver version, firmware version, and both printer driver and firmware versions.

In the above-described first and second embodiments, lineup information contains pieces of information for Asia, Europe, and North America, but the present invention is not limited to this. For example, it is also possible that the lineup information contains pieces of lineup information for other areas such as Japan and Russia and a desired area is selected from them.

Of inkjet printing methods, the above-described embodiments adopt a method which uses a means (e.g., an electro-thermal transducer) for generating heat energy as ink discharge ink energy and changes the ink state by the heat energy, thereby achieving a high printing density and high resolution.

In addition, the inkjet printing apparatus according to the present invention may be used as an image output apparatus for an information processing apparatus such as a computer. The inkjet printing apparatus may also take the form of a copying machine combined with a reader or the like, or a facsimile apparatus having a transmission/reception function.

In the prior art and reference example, when a newly available medium is added, all existing media lineups need be created again. In contrast, in the first and second embodiments described above, it suffices to update the medium lineup information 700 every time a new medium becomes available, and add information (driver medium characteristic information and printer medium control information) of the newly available medium. Consequently, work volume by the developer becomes very light, and the cost of creating a media lineup can be decreased.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-158552, filed Jun. 17, 2008, which is hereby incorporated by reference herein in its entirety.

The invention claimed is:

1. A printing system comprising a printing apparatus capable of printing on a plurality of types of media, and a host which supplies information necessary for printing to said printing apparatus,
wherein said printing apparatus comprises:
firmware which controls a print operation;
a nonvolatile memory which stores medium control information separated from said firmware and referred to when said firmware controls the print operation; and
a printer engine which prints on the medium by executing said firmware, and
wherein said host comprises:
a printer driver which generates image data and a control command to be supplied to said printing apparatus;
storage means for storing medium characteristic information separated from said printer driver and referred to when said printer driver generates the image data and the control command;
holding means for holding medium integrated information containing medium characteristic information and medium control information on one medium;
display means for displaying, based on lineup information for creating media integrated information comprised from pieces of medium integrated information of a plurality of media, a menu window to prompt a user to select the lineup information; and
update means for creating the media integrated information from medium integrated information described in lineup information selected by the user from the menu displayed on said display means, and updating the medium control information stored in said nonvolatile memory of said printing apparatus and the medium characteristic information stored in said storage means by using the created media integrated information, and
wherein said update means comprises:
comparison means for comparing the medium control information stored in said nonvolatile memory of said printing apparatus with medium control information contained in the media integrated information; and
control means for controlling to update said nonvolatile memory of said printing apparatus and update said storage means in accordance with a result of the comparison by said comparison means,
wherein said control means controls to update said storage means without updating said nonvolatile memory of said printing apparatus in a case where the medium control information stored in said nonvolatile memory of said printing apparatus matches the medium control information contained in the media integrated information as the result of the comparison by said comparison means, and
wherein said control means controls to update both said nonvolatile memory of said printing apparatus and said storage means in a case where the medium control information stored in said nonvolatile memory of said printing apparatus does not match the medium control information contained in the media integrated information as the result of the comparison by said comparison means.

2. The printing system according to claim 1, wherein said printing apparatus further comprises an inkjet printhead for printing on the medium.

3. An information update method in a printing system including a printing apparatus capable of printing on a plurality of types of media, and a host which supplies information necessary for printing to the printing apparatus, the method comprising:
a print control step of causing the host to control the printing apparatus to print by using medium control information, separated from firmware, for controlling a print operation of the printing apparatus, stored in a nonvolatile memory of the printing apparatus, and referred to when the firmware controls the print operation, and medium characteristic information, separated from a printer driver that generates image data and a control command to be supplied to the printing apparatus, runs in the host, and is stored in a memory of the host, and referred to when the printer driver generates the image data and the control command;

a display step of causing the host to display, based on lineup information for creating media integrated information comprised from pieces of medium integrated information of a plurality of media by using medium integrated information which is held in the host and contains medium characteristic information and medium control information on one medium, a menu window on a display of the host to prompt a user to select the lineup information; and an update step of creating the media integrated information from medium integrated information described in lineup information selected by the user from the menu, and updating the medium characteristic information stored in the memory of the host and the medium control information stored in the nonvolatile memory of the printing apparatus by using the created media integrated information, wherein the update step comprises:

a comparison step of comparing the medium control information stored in the nonvolatile memory of the printing apparatus with medium control information contained in the media integrated information; and a control step of controlling to update the nonvolatile memory of the printing apparatus and update the memory of the host in accordance with a result of the comparison in the comparison step, wherein, in the control step, in a case where the medium control information stored in the nonvolatile memory of the printing apparatus matches the medium control information contained in the media integrated information as the result of the comparison in the comparison step, the memory of the host is controlled to be updated without updating the nonvolatile memory of the printing apparatus, and in the control step, in a case where the medium control information stored in the nonvolatile memory of the printing apparatus does not match the medium control information contained in the media integrated information as the result of the comparison in the comparison step, both the nonvolatile memory of the printing apparatus and the memory of the host are controlled to be updated.

4. The information update method according to claim 3, wherein the menu prompts the user to select an area where a new medium is available.

5. The information update method according to claim 3, wherein the menu prompts the user to select an application purpose for which a new medium is available.

6. A non-transitory computer-readable medium storing, in executable form, a program executed in a host computer which is connected to a printing apparatus capable of printing on a plurality of types of media and including storage means for storing medium control information to be referred to when controlling a print operation, and which operates a printer driver for generating image data and a control command to be supplied to the printing apparatus by referring to medium characteristic information stored in a memory of the host computer separately from the printer driver, the program causing the host computer to execute:

a procedure of displaying, based on lineup information for media integrated information comprised from pieces of medium integrated information of a plurality of media by using medium integrated information which is held in the host computer and contains medium characteristic information and medium control information on one medium, a menu window on a display of the host computer to prompt a user to select the lineup information, and a procedure of creating the media integrated information from medium integrated information described in lineup information selected by the user from the menu, and using the created media integrated information to control to update the medium characteristic information stored in the memory of the host computer and control the printing apparatus to update the medium control information stored in the storage means of the printing apparatus, wherein, in the update, the medium control information stored in the storage means of the printing apparatus is compared with medium control information contained in the media integrated information, and wherein updating of the storage means of the printing apparatus and updating of the memory is controlled in accordance with a result of the comparison, wherein, in the control, as the result of the comparison, in a case where the medium control information stored in the storage means of the printing apparatus matches the medium control information contained in the media integrated information, the memory is controlled to be updated without updating the storage means of the printing apparatus, and in a case where the medium control information stored in the storage means of the printing apparatus does not match the medium control information contained in the media integrated information, both the storage means of the printing apparatus and the memory are controlled to be updated.

* * * * *